US012300070B2

(12) United States Patent
Carli et al.

(10) Patent No.: US 12,300,070 B2
(45) Date of Patent: *May 13, 2025

(54) METHOD AND SYSTEM FOR CUSTOMIZABLE SIDE BET PLACEMENT

(71) Applicant: IGT, Las Vegas, NV (US)

(72) Inventors: Matteo Carli, Reno, NV (US); Paul Baskerville, Las Vegas, NV (US); Donald Humphreys, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,125

(22) Filed: Mar. 15, 2024

(65) Prior Publication Data

US 2024/0221466 A1 Jul. 4, 2024

Related U.S. Application Data

(63) Continuation of application No. 18/140,353, filed on Apr. 27, 2023, now Pat. No. 12,002,328, which is a (Continued)

(51) Int. Cl.
*G07F 17/32* (2006.01)

(52) U.S. Cl.
CPC ...... *G07F 17/3262* (2013.01); *G07F 17/3209* (2013.01); *G07F 17/3211* (2013.01); (Continued)

(58) Field of Classification Search
CPC ........................................................ G07F 17/32
See application file for complete search history.

(56) References Cited

U.S. PATENT DOCUMENTS

| | | | |
|---|---|---|---|
| D459,361 | S | 6/2002 | Inagaki |
| 6,658,568 | B1 | 12/2003 | Ginter et al. |

(Continued)

FOREIGN PATENT DOCUMENTS

| | | |
|---|---|---|
| CN | 305280896 | 7/2019 |
| CN | 305351651 | 9/2019 |
| CN | 305408916 | 10/2019 |

OTHER PUBLICATIONS

"Colored Arrows Collection," Jun. 25, 2016, 3 pages [retrieved online from: "www.freepik.com/free-vector/arrow-colored-collection_892310.htm", "img.freeik.com/free-vector/arrow-colored-collection_23-2147557055.jpg" and "tineye.com/search/0524dd08782200315612f711c872e7814785e417?s"].

(Continued)

*Primary Examiner* — Omkar A Deodhar
(74) *Attorney, Agent, or Firm* — Sheridan Ross P.C.

(57) ABSTRACT

An electronic gaming system is capable of providing players with customized subsets of side bets. The system can provide, by the user interface, the player with a player-selectable set of side bets; receive, from the player through the user interface, a selection of a subset of the player-selectable set of side bets for the player to use in a gaming session, with a number of side bets in the subset selected by the player being less than a number of side bets in the player-selectable set of side bets; initiate the gaming session comprising a side bet placed on an enabled side bet; determine an outcome of the gaming session relative to the enabled side bet; and adjust a value of an electronic record associated with an account of the player to reflect the outcome of the gaming session.

20 Claims, 13 Drawing Sheets

Related U.S. Application Data continuation of application No. 17/345,580, filed on Jun. 11, 2021, now Pat. No. 11,727,759, which is a continuation of application No. 16/388,214, filed on Apr. 18, 2019, now Pat. No. 11,043,072.

(52) U.S. Cl.
CPC ...... *G07F 17/3244* (2013.01); *G07F 17/3288* (2013.01); *G07F 17/3293* (2013.01)

(56) References Cited

U.S. PATENT DOCUMENTS

| | | | |
|---|---|---|---|
| D506,208 | S | 6/2005 | Jewitt et al. |
| D547,770 | S | 7/2007 | Griffith |
| 7,294,058 | B1 | 11/2007 | Slomiany et al. |
| D580,951 | S | 11/2008 | Niizawa et al. |
| D598,468 | S | 8/2009 | Hirsch et al. |
| D606,551 | S | 12/2009 | Willis |
| 8,033,910 | B2 | 10/2011 | Davis |
| D656,515 | S | 3/2012 | Bechtold et al. |
| D662,511 | S | 6/2012 | Want et al. |
| 8,277,314 | B2 | 10/2012 | Wolf et al. |
| D680,551 | S | 4/2013 | Ishii et al. |
| D684,190 | S | 6/2013 | Ridl et al. |
| 8,501,479 | B2 | 8/2013 | Smith et al. |
| 8,616,949 | B2 | 12/2013 | Okada |
| D705,807 | S | 5/2014 | Tursi |
| D729,273 | S | 5/2015 | Mariet et al. |
| D738,400 | S | 9/2015 | Bang et al. |
| D743,439 | S | 11/2015 | Torres et al. |
| D753,717 | S | 4/2016 | Mariet et al. |
| D753,720 | S | 4/2016 | Mariet et al. |
| D753,722 | S | 4/2016 | Mariet et al. |
| D754,204 | S | 4/2016 | Mariet et al. |
| 9,327,186 | B1 | 5/2016 | Pececnik |
| 9,666,024 | B2 | 5/2017 | Chun |
| D791,802 | S | 7/2017 | Solop et al. |
| D793,439 | S | 8/2017 | MacLean |
| D810,758 | S | 2/2018 | Choi et al. |
| 10,013,848 | B2 | 7/2018 | Chun |
| D865,804 | S | 11/2019 | Warner et al. |
| D881,919 | S | 4/2020 | Elgena et al. |
| D889,498 | S | 7/2020 | Brinker et al. |
| D892,159 | S | 8/2020 | Paul et al. |
| D893,543 | S | 8/2020 | Paul et al. |
| D903,694 | S | 12/2020 | Elgena et al. |
| 11,043,072 | B2 | 6/2021 | Carli et al. |
| 11,222,510 | B2 | 1/2022 | Baskerville |
| D978,910 | S | 2/2023 | Yuk |
| 11,727,759 | B2 | 8/2023 | Carli et al. |
| D1,026,935 | S | 5/2024 | Carli et al. |
| 12,002,328 | B2 | 6/2024 | Carli et al. |
| 2002/0198044 | A1 | 12/2002 | Walker et al. |
| 2004/0219969 | A1 | 11/2004 | Casey et al. |
| 2006/0192338 | A1 | 8/2006 | Chen et al. |
| 2008/0113767 | A1 | 5/2008 | Nguyen et al. |
| 2009/0111573 | A1 | 4/2009 | Iddings |
| 2009/0143141 | A1 | 6/2009 | Wells et al. |
| 2009/0253408 | A1 | 10/2009 | Fitzgerald et al. |
| 2011/0278795 | A1 | 11/2011 | Denke |
| 2014/0194183 | A1 | 7/2014 | Pierer et al. |
| 2016/0124514 | A1 | 5/2016 | Cha et al. |
| 2016/0248894 | A1 | 8/2016 | Hosoi et al. |
| 2018/0082513 | A1 | 3/2018 | Souffront et al. |
| 2018/0286179 | A1 | 10/2018 | Davis et al. |
| 2019/0043315 | A1 | 2/2019 | Laduca et al. |
| 2019/0043318 | A1 | 2/2019 | Chun et al. |
| 2022/0189248 | A1 | 6/2022 | Maya et al. |

OTHER PUBLICATIONS

Akkurt et al., "A GUI for Computational Phantom with Freely Moving Arms and Legs," The Am. Nuclear Society Annual Meeting, Jun. 24-28, 2007, Nuclear Sci. & Tech. Div. (94), 3 pages.

Blankstock, Back to top arrow sign icon, Publication Date Oct. 10, 2016, Retrieved Date Apr. 6, 2023, Retrieved from Internet, <https://www.istockphoto.com/vector/back-to-top-arrow-sign-icon-scroll-up-symbol-gm613313690-105857425>.

Blankstock, Back to top arrow sign icon, Publication Date Jul. 12, 2016, Retrieved Date Apr. 6, 2023, Retrieved from Internet, <https://www.istockphoto.com/vector/back-to-top-arrow-sign-icon-scroll-up-symbol-gm546000728-98547473>.

Dilen_ua, Exchange stock illustration, Publication Date Jul. 21, 2019, Retrieved Date Apr. 13, 2023, Retrieved from Internet, <https://www.istockphoto.com/vector/exchange-gm1163311446-319384271>.

Dilen_ua, Exchange icon stock illustration, Publication Date Oct. 29, 2019, Retrieved Date Apr. 13, 2023, Retrieved from Internet, <https://www.istockphoto.com/vector/exchange-icon-gm1184114348-333185593>.

Dstarky, Simple collection of exchange related line icons, Publication Date Oct. 31, 2017, Retrieved Date d4-13-2023, Retrieved from Internet, <https://www.istockphoto.com/vector/simle-collection-of-exchange-related-line-icons-gm868923848-144564753>.

EivaaGames "3D Pool Game PC—Gameplay Video—1.0.2," YouTube, Oct. 2, 2010, pages [retrieved online from: www.youtube.com/watch?v=aNlk1Z6i3-I].

Gothappy, Arrow exchange letter b logo symbol icon arrows letter q . . . , Publication Date Apr. 23, 2019, Retrieved Date Apr. 13, 2023, Retrieved from Internet <https://www.istockphoto.com/vector/arrow-exchange-letter-b-logo-symbol-icon-arrows-letter-q-abstract-business-log-gm1144465207-307689875>.

Hilch, Arrow Exchange thin line icon, Publication Date Sep. 5, 2017, Retrieved Date Apr. 13, 2023, Retrieved from Internet, <https://www.istockphoto.com/vector/arrow-exchange-thin-line-icon-linear-vector-symbol-gm843182476-137809977>.

Nurlaelyrahma, Icon Switch Video, Publication Date Apr. 22, 2022, Retrieved Date Apr. 13, 2023, Retrieved from Internet, <https://www.istockphoto.com/vector/icon-switch-video-suitable-for-photo-editing-symbol-long-shadow-style-simple-design-gm1392714373-448865342>.

Rambo182, Arrow Icons, Publication Date Dec. 11, 2018, Retrieved Date Apr. 13, 2023, Retrieved from Internet, https://www.istockphoto.com/vector/arrow-icons-for-mobile-and-web-gm1080795506-289750763>.

Tamburin "Ultimate Guide to Blackjack: Blackjack Side Bets, Chapter 11," Cassava Enterprises (Gibraltar) Limited, 2017, 6 pages [retrieved online from: www.888casino.com/blog/blackjack-strategy-guide/blackjack-side-bets].

Turac Novruzova, Dollar coin exchange line and solid icon, Publication Date Mar. 21, 2020, Retrieved Date Apr. 13, 2023, Retrieved from Internet, <https://www.istockphoto.com/vector/dollar-coin-exchange-line-and-solid-icon-bank-transaction-with-arrows-symbol-gm1213711936-352853228>.

Turac Novruzova, Cash Flow with location map pin line and solid icon, Publication Date Mar. 21, 2020, Retrieved Date Apr. 13, 2023, Retrieved from Internet, <https://www.istockphoto.com/vector/cash-flow-with-location-map-pin-line-and-solid-icon-dollar-funds-exchange-symbol-gm1213712139-352853475>.

Yaun-Ti Lin "Blue background with different styles of arrows stock illustration," Stockphoto LP, Jun. 11, 2008, Stock Illustration ID: 165551704, 4 pages [retrieved online from: www.istockphoto.com/vector/blue-background-with-different-styles-of-arrows-gm165551704-6353638?phrase=double+arrow].

Official Action for U.S. Appl. No. 16/388,214, dated Aug. 7, 2020 12 pages.

Notice of Allowance for U.S. Appl. No. 16/388,214, dated Feb. 11, 2021 7 pages.

Official Action for U.S. Appl. No. 17/345,580, dated Sep. 14, 2022 12 pages.

Official Action for U.S. Appl. No. 17/345,580, dated Jan. 12, 2023 14 pages.

Notice of Allowance for U.S. Appl. No. 17/345,580, dated Mar. 22, 2023.

Notice of Allowance for U.S. Appl. No. 18/140,353, dated Nov. 8, 2023 9 pages.

(56) References Cited

OTHER PUBLICATIONS

Notice of Allowance for U.S. Appl. No. 18/140,353, dated Dec. 20, 2023 8 pages.
Official Action for U.S. Appl. No. 29/822,567, dated Aug. 3, 2023 9 pages.
Notice of Allowance for U.S. Appl. No. 29/822,567, dated Jan. 2, 2024 8 pages.
Official Action for U.S. Appl. No. 29/819,169, dated Apr. 28, 2023 14 pages.
Notice of Allowance for U.S. Appl. No. 29/819,169, dated Jul. 7, 2023 7 pages.

METHOD AND SYSTEM FOR CUSTOMIZABLE SIDE BET PLACEMENT

CROSS REFERENCE TO RELATED APPLICATIONS

The present application is a continuation of and claims the benefit of and priority to U.S. patent application Ser. No. 18/140,353, filed Apr. 27, 2023, which is a continuation of and claims the benefit of priority to U.S. patent application Ser. No. 17/345,580, filed Jun. 11, 2021, now U.S. Pat. No. 11,727,759, issued Aug. 15, 2023, which is a continuation of and claims the benefit of and priority to U.S. patent application Ser. No. 16/388,214, filed Apr. 18, 2019, now U.S. Pat. No. 11,043,072, issued Jun. 22, 2021, the entire disclosures of each of which are incorporated herein by reference.

BACKGROUND

The present disclosure relates generally to gaming systems and, in particular, to side bet management in a gaming system.

In card and non-card games of chance, casinos may use proposition bets. A "proposition bet" (e.g., prop bet, prop, novelty, proxy bet, backbet, or a side bet) is a bet made regarding the occurrence or non-occurrence during a game of an event not directly affecting the game's final outcome. Examples of side bets include 21+3, Royal Match, Over/Under 13, Super Sevens, Lucky Ladies, and Pair Square in blackjack, to name a few.

BRIEF SUMMARY

In certain embodiments, the present disclosure relates to an electronic gaming system for a player in which side bets are capable of being customized for each player during a gaming session. In some embodiments, the electronic gaming system comprises a communication interface to display gaming information and receive player input, a processor coupled with the communication interface, and a memory coupled with and readable by the processor and storing therein a set of instructions. The set of instructions, when executed by the processor causes the processor to provide the player with a player-selectable set of side bets through the user interface; receive, from each player through the user interface, a selection of a subset of the player-selectable set of side bets for the player to use in a gaming session, wherein a number of side bets in the subset selected by the player is less than a number of side bets in the player-selectable set of side bets; initiate the gaming session comprising a side bet placed on a side bet in the subset selected by the player; determine an outcome of the gaming session relative to the side bet; and adjust a value of an electronic record associated with an account of the player to reflect the outcome of the gaming session.

In some embodiments, the present disclosure relates to a method for operating an electronic gaming system in which side bets are capable of being customized for each player during a gaming session. In some embodiments, the method comprises: providing a player with a player-selectable set of side bets through a user interface; receiving, from the player through the user interface, a selection of a subset of the player-selectable set of side bets for the player to use in a gaming session, wherein a number of side bets in the subset selected by the player is less than a number of side bets in the player-selectable set of side bets; initiating, by a processor, the gaming session comprising a side bet wager placed on a side bet in the subset selected by the player; determining, by the processor, an outcome of the gaming session relative to the side bet; and adjusting, by the processor, a value of an electronic record associated with an account of the player to reflect the outcome.

In some embodiments, the present disclosure relates to a gaming system in which side bets are capable of being customized for each player during a gaming session. In some embodiments, the gaming system comprises: a user interface to display gaming information and receive input from a plurality of players, a processor coupled with the user interface, and a memory coupled with and readable by the processor and storing therein a set of instructions. The set of instructions, when executed by the processor, causes the processor to provide, by the user interface, each of the plurality of players with a player-selectable set of side bets; receive, from each player through the user interface, a corresponding player-selected subset of the player-selectable set of side bets; display, for each player to use in a multi-player gaming session among the plurality of players and by the user interface, the corresponding player-selected subset of the player-selectable set of side bets, with a first display configuration of a first subset of the player-selectable set of side bets selected by a first player in the plurality of players being different from a second display configuration of a second subset of the player-selectable set of side bets selected by a second player in the plurality of players; initiate the multi-player gaming session comprising game and side bet wagers placed by the plurality of players; determine an outcome of the multi-player gaming session relative to the game and side bet wagers; and adjust a value of an electronic record associated with an account of a player to reflect the outcome.

Additional features are described herein and will be apparent from the following Description and the figures.

DETAILED DESCRIPTION

Figure 1:
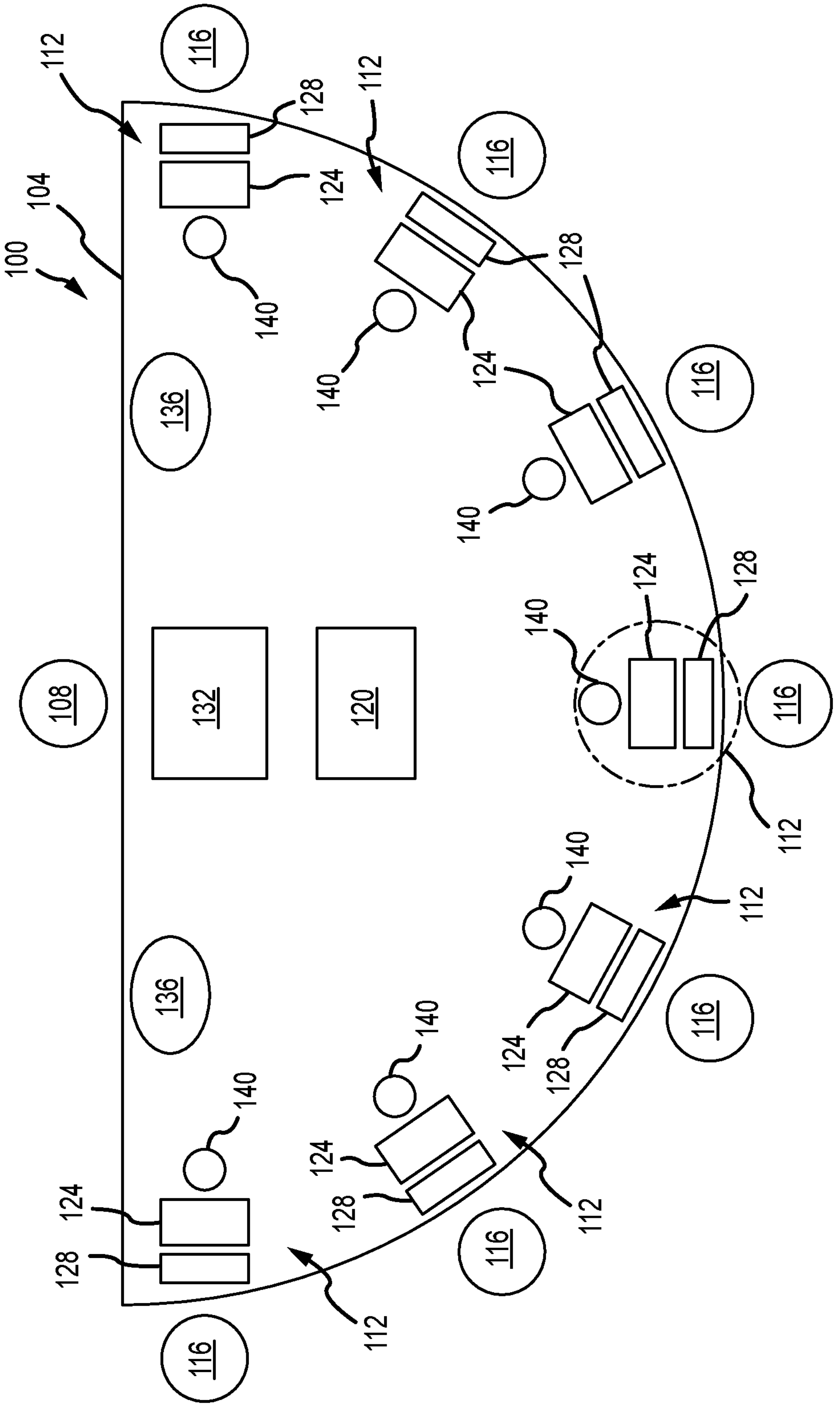
FIG. 1 is a block diagram of a gaming system in accordance with embodiments of the present disclosure.

Embodiments of the present disclosure will be described in connection with a gaming system having one or multiple user devices that enable gaming activity. While certain embodiments of the present disclosure will reference the use of an Electronic Gaming Machine (EGM) or Electronic Table Game (ETG) as a gaming system that enables players to participate in gaming activity, it should be appreciated that embodiments of the present disclosure are not so limited. For example, embodiments of the present disclosure apply to a virtual gaming machine or video gaming gambling machine (VGM).

According to embodiments of the present disclosure, a gaming system can provide an improved gaming experience by providing a user interface that enables a player to customize side bets for a gaming session, such as a card or non-card game of chance. The side bet customization by a player can be from a player-selectable set of side bets that vary depending on the game of chance to be played in the gaming session. Side bet customization can enable more players to engage in a single instance of a game of chance. In addition to creating a sense of camaraderie between the primary player and the side betting player, the side bet-betting player often feels like they have an additional opportunity for winning a particular game of chance. Customized side bets can also increase a number and frequency of player awards while increasing gaming revenue for casinos (without requiring additional casino funding or change of casino payout tables for the games in the gaming session).

Prior to the present disclosure, it has been difficult if not impossible to efficiently enable side bet customization. For instance, asking a dealer to manage and track each customized side bet is difficult proposition given all of the other requirements placed on a dealer. As another example, even automated systems have yet to deploy customizable side bet capabilities, likely due to the difficulty in configuring pay tables and game rules on the fly in addition to managing the appropriate payouts for a winning customized side bet.

In an embodiment, a common electronic table game has multiple players, with each player (and corresponding player seating position) being able to customize his or her subset of possible side bets to provide, collectively for the table, multiple different subsets of possible side bets. This can be done by the enablement, for each player, of a subset of side bets from a larger group of side bets available table-wide for player selection. There may or may not be a requirement that all of the players to (and seating positions in) a common game of chance have the same set of side bets. Such player flexibility and customization can be on a per table or per casino basis. Each side bet can have an independent credit meter. The casino operator can choose if they want to have, at any time, one or more side bets available to the player. As more side bets are added, the casino operator can choose and automatically implement selected display positions for side bets to maximize each side bet's visibility according to an operator's preferences.

Generally, the side bet can be any bet or wager made regarding the occurrence or non-occurrence during a game of chance of an event not directly affecting the game's final outcome. By way of illustration, when the game of chance is blackjack the player-selectable set of side bets can include a plurality of: super sevens, royal match, streak blackjack, over/under 13, pair square, 21+3, 21 magic, bet the bust, blackjack match, blazing 7's, block pro blackjack, bonus blackjack, bonus jackpot, bust, bust bonus, buster blackjack, C3, copy cat, crazy 7's, dead man's hand, extra bet blackjack, in BETween, hot 3, lucky ladies, bonus blackjack, bonanza blackjack, hi/low, 2 through 6, jack magic, match the dealer, lucky, next step, pair 'em up, perfect 11's, player blackjack in the first two cards, raise the roof, royal 20's, spread-bet, super 4, suit 'em up, bonus spin, dare any pairs, bad beat blackjack, bet the set, in bet, bust it!, the lucky stiff, highhand, pair play, push your luck, tie version 2, sweet sixteen, dare any pair, progressive blackjack, twin blackjack, perfect pairs, wild aces, Zurich progressive, and hit and run. When the game of chance is baccarat, the player-selectable set of side bets can include, for example, a plurality of: Bellagio match, 3-card six, lucky bonus, super 6, 4-5-6, royal match, dragon 7, dragon bonus, matching dragon, either pair, perfect pair, rabbit play, egalite bets, panda 8, first two banker/player cards same suit, total points odd/even, unlucky 8, suited 3-card 8, all red/black, total points over/under, lucky 8, double suited 3-card 8, double 8, quik, and big and small. When the game of chance is roulette, the player-selectable set of side bets can include, for example, a progressive roulette side bet and/or a roulette number grouping side bet. When the game of chance is a dice game such as sic bo, a wheel game, or a slot game, the player-selectable set of side bets can include any desirable side bets for the particular game. One of ordinary skill in the art will understand that these examples are not exhaustive and that the side bets contemplated by this disclosure can include a virtually endless array of side bets depending on the particular game of chance.

Embodiments can include EGMs or ETGs which allow players at the gaming systems not only to participate in side wagering activities but also to play concurrently in an active gaming session at the gaming system. The player desiring to place a side bet, or the side wagering player, can place the wager on an outcome of his or her gaming session or on an event or activity that is dependent, at least in part, on the decisions or actions of a third party. The third party can be, for example, another person or a machine. The side wagering player does not necessarily have to be an active player of or have control over the gaming activity that is the subject of the side bet, although an active player may also be allowed to participate as a side wagering player.

As used in this disclosure, the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

With reference now to FIG. 1, a multi-player ETG system 100 is depicted that is enabled for side betting and includes ETG 104, dealer 108, and players 116. The ETG system 100 includes a common table display system 120 and a plurality of individual player station gaming systems 112.

The common table display 120 may present information for the exclusive use of the dealer and other information to be viewed by the dealer, players, spectators, and other persons. Various types of information which may be displayed at the common display 120 include dealer cards, ante information, common or shared player cards, individual player cards, side bet options, and wager information. In one embodiment, the common display 120 may be used to reveal cards of selected players (when appropriate); verify cards dealt to selected players; display the dealer's cards; display game play instructions; display table configuration information; display wagering information; indicate which of the players is currently playing (e.g., show active player); display active players' actions (e.g., Hit, Hold, Double Down); identify players waiting for an opening at the table (e.g., next up); display community cards; display bonus game; display progressive jackpots; display information relating to side wagers placed by players at the gaming table; display information relating available side wager opportunities; and display winning and/or losing outcomes for each player.

Each player station gaming system 112 includes a corresponding electronic display 124 and may also include a corresponding player input interface 128. The electronic display 124 displays changeable display content such as graphical representations of playing cards (e.g., virtual playing cards) and other information used to convey game play information, game status information, wager information, and the like. The electronic displays 124 and input interface 128 can allow players to perform various other activities, such as for example, performing searches for available side wagering opportunities; configuring the corresponding player station gaming system 112 with a customized set of side bets; placing one or more side bet wagers; and monitoring game play activities, of the current gaming session and gaming sessions of other players on other gaming systems.

In one embodiment, the plurality of electronic displays 124 are interactive with users and may be implemented as separate physical touch-screen displays which have been mounted into (or onto) the body of a conventional-type casino gaming table. In an alternate embodiment, the entire top surface (or selected portions thereof) of the intelligent gaming table 104 may be implemented as a continuous display using multi-touch technology for supporting, across the player station gaming systems 112, multiple simultaneous touch points enabling concurrent real-time multi-player interaction, and the electronic displays 124 implemented as specific display regions within the continuous display.

Each player station gaming system 112 includes a corresponding player wagering zone or gaming chip placement zone 140.

The ETG system 100 can include a table control console 132 for use by the dealer and/or other casino employees. In one implementation, the table control console 132 may be used to facilitate and execute game play operations and table configuration operations and can include an electronic display or other user interface to receive user commands and provide an interactive display.

The ETG system 100 can include one or more speakers 136 to provide various types of audio information such as game related information (e.g., instructions to players and/or dealer, sound effects, etc.), casino related announcements, gaming table status information, music, attracts, promotions, bonus information, and communication information (e.g., for speakerphone or two-way radio communications).

The ETG system 100 can have a playing surface configured for use by players in the gaming session. In a card game for example, a plurality of players 116 sit or stand along the semicircular portion and play a desired live card game, such as blackjack, baccarat, and poker, on the playing surface.

Figure 2:
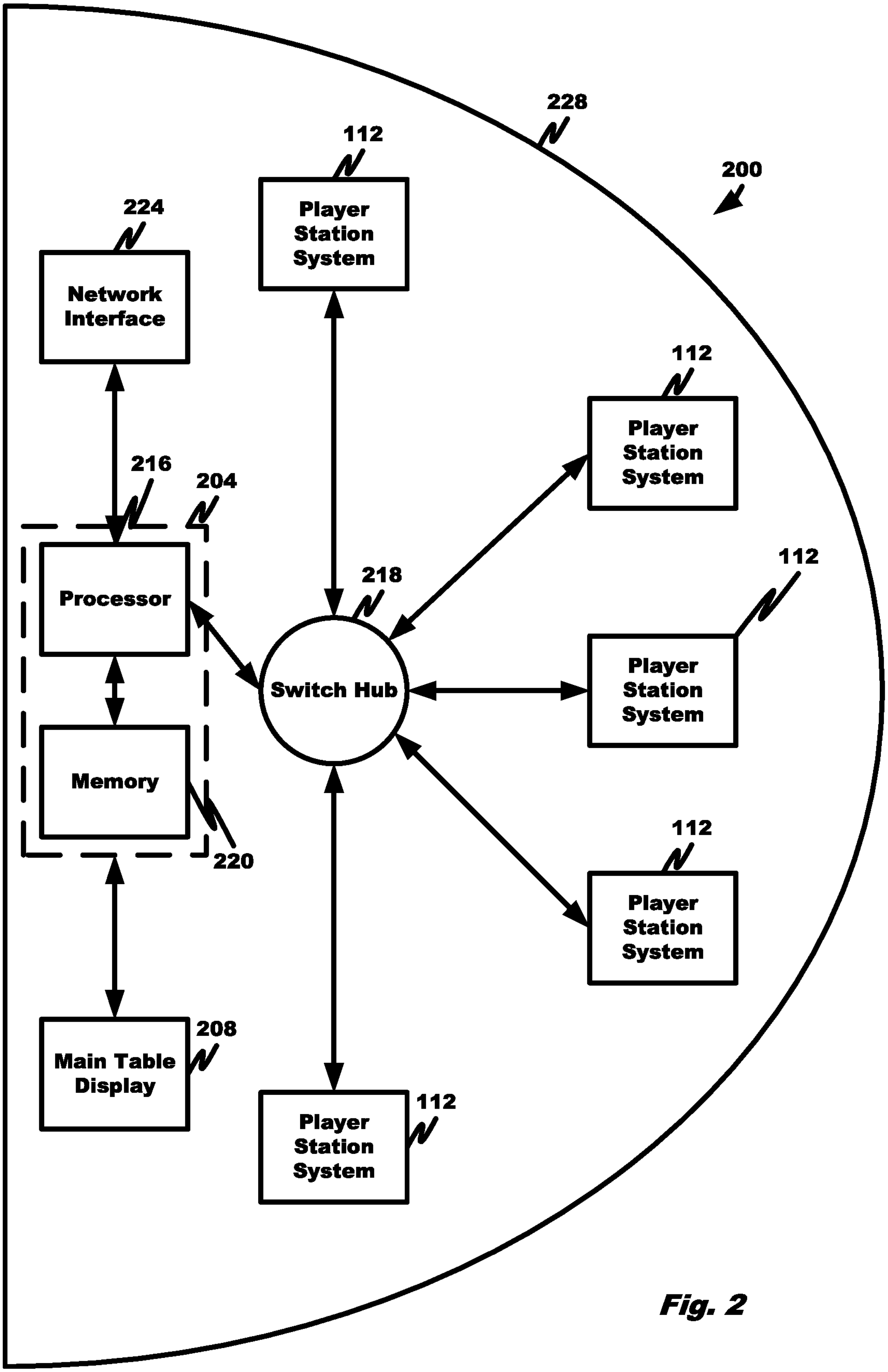
FIG. 2 is a block diagram of a gaming system in accordance with embodiments of the present disclosure.

With reference to FIG. 2, a multi-player ETG system 200 for side wagering according to another embodiment is depicted. The ETG system 200 includes an ETG 228 having a master table controller (MTC) 204, a main multi-touch table display system 208 and a plurality of player station gaming systems 112 which, for example, may be connected to the MTC 204 via at least one switch or hub 218. In at least one embodiment, the MTC 204 may include at least one processor or CPU 216, and memory 220. Additionally, the ETG system 200 may also include one or more network interfaces 224 for communicating with other devices and/or systems in a casino network.

According to one embodiment, the ETG system 200 may be operable to read, receive signals, and/or obtain information from various types of media (e.g., player tracking cards) and/or other devices such as those issued by the casino. For example, media detector/reader may detect wireless signals from one or more wireless devices (such as, for example, an RFID-enabled player tracking card) in the possession of players at the gaming table. The media detector/reader may also be operable to utilize the detected wireless signals to determine the identity of individual players associated with each of the different player tracking cards.

While the ETG systems 100 and 200 are described with reference to card games, the ETG systems 100 or 200 can be modified to enable players to play automated and live card and noncard games of chance, including dice games, such as craps and sic bo, and roulette and wheel games.

Figure 3:
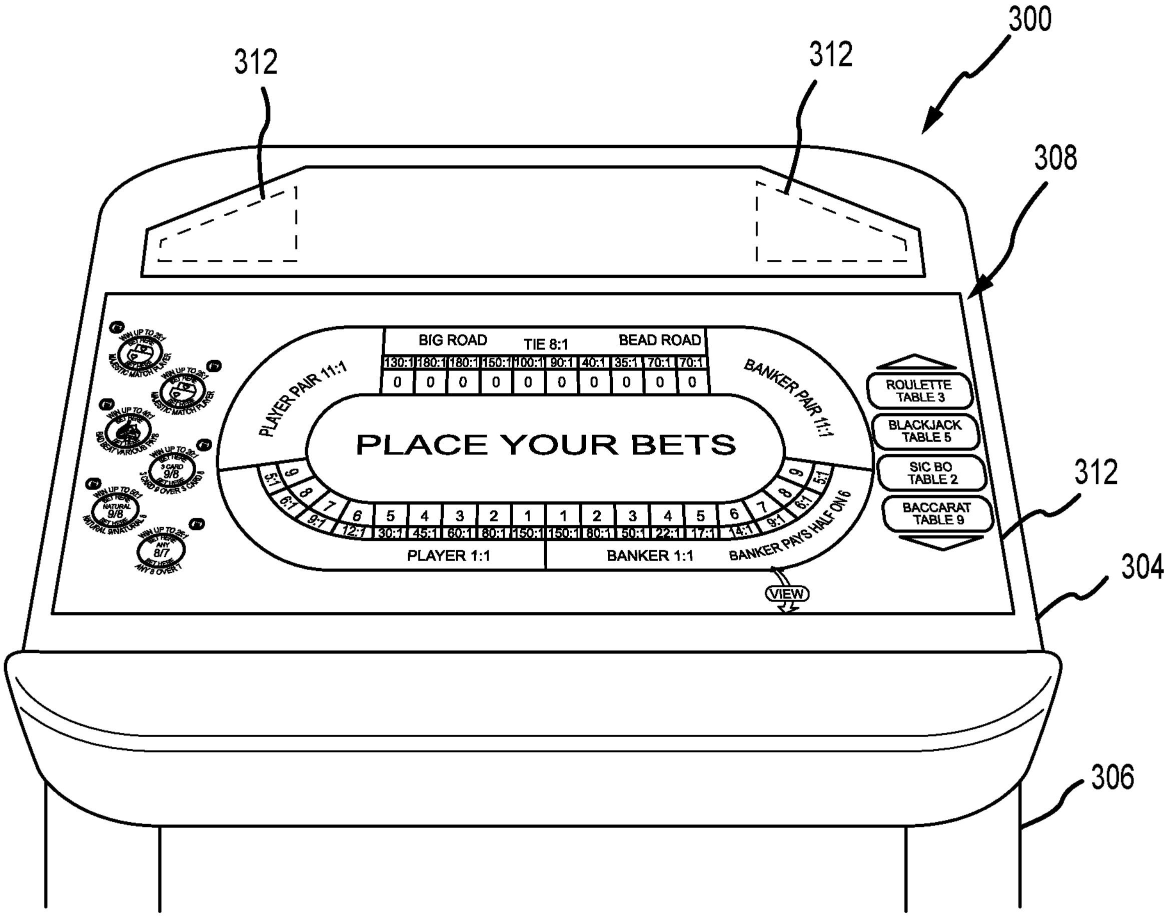
FIG. 3 is a perspective view of a gaming system in accordance with embodiments of the present disclosure.

With reference to FIG. 3, an electronic gaming system 300 configured as a gaming terminal is depicted according to another embodiment. The electronic gaming system 300 may correspond to a non-limiting example of a player station gaming system 112 of FIG. 1 or 2. The electronic gaming system 300 can be linked to various different types of table games and to multiple different electronic gaming tables, including simultaneously. The gaming system 300 can include any suitable EGM and may include any platform capable of receiving and transmitting data, including "thin-client" platforms or platforms which do not process game play data and "smart" platforms or platforms which process game play data. The electronic gaming system 300 may be stationary, similar to the slot machines or electronic gaming tables commonly seen at the physical casino, and/or may include various types of portable electronic devices such as smart phones, computer tablets, portable media players, laptop computers, desktop computers, smart TV, smart glasses, and the like.

Although a wide variety of possible layouts and arrangements can be applied to any given electronic gaming system 300, a particular configuration is provided by way of illustration. As is generally shown in FIG. 3, the electronic gaming system 300 can include an outer housing 304 that may include a processor or controller (not shown) located therein and supporting legs 306. Numerous input and output components can be located at various locations about the electronic gaming system 300. One or more lights or lamps can indicate various statuses or states by way of lit, unlit and color arrangements. A user interface 308 can include a display 312 to provide various displays to a player, as well as touchscreens that accept player input. Alternatively, or in addition, the user interface can include one or more buttons may also be provided for player inputs. Alternatively, or in addition, the user interface can include gesture recognition devices, such as one or more cameras (not shown) and gesture recognition image processing software. Generally, the gesture recognition image processing software detects a player gesture; recognizes the detected gesture; maps the recognized gesture to a corresponding command; and executes or causes execution of the corresponding command. Other components can include a ticket printer (not shown), bill acceptor (not shown), and one or more speakers 312. Many other input and output components may also be provided at electronic gaming system 300, as will be readily appreciated. Further, other configurations, arrangements, shapes and sizes for the electronic gaming system 300 may also be used.

Figure 4:
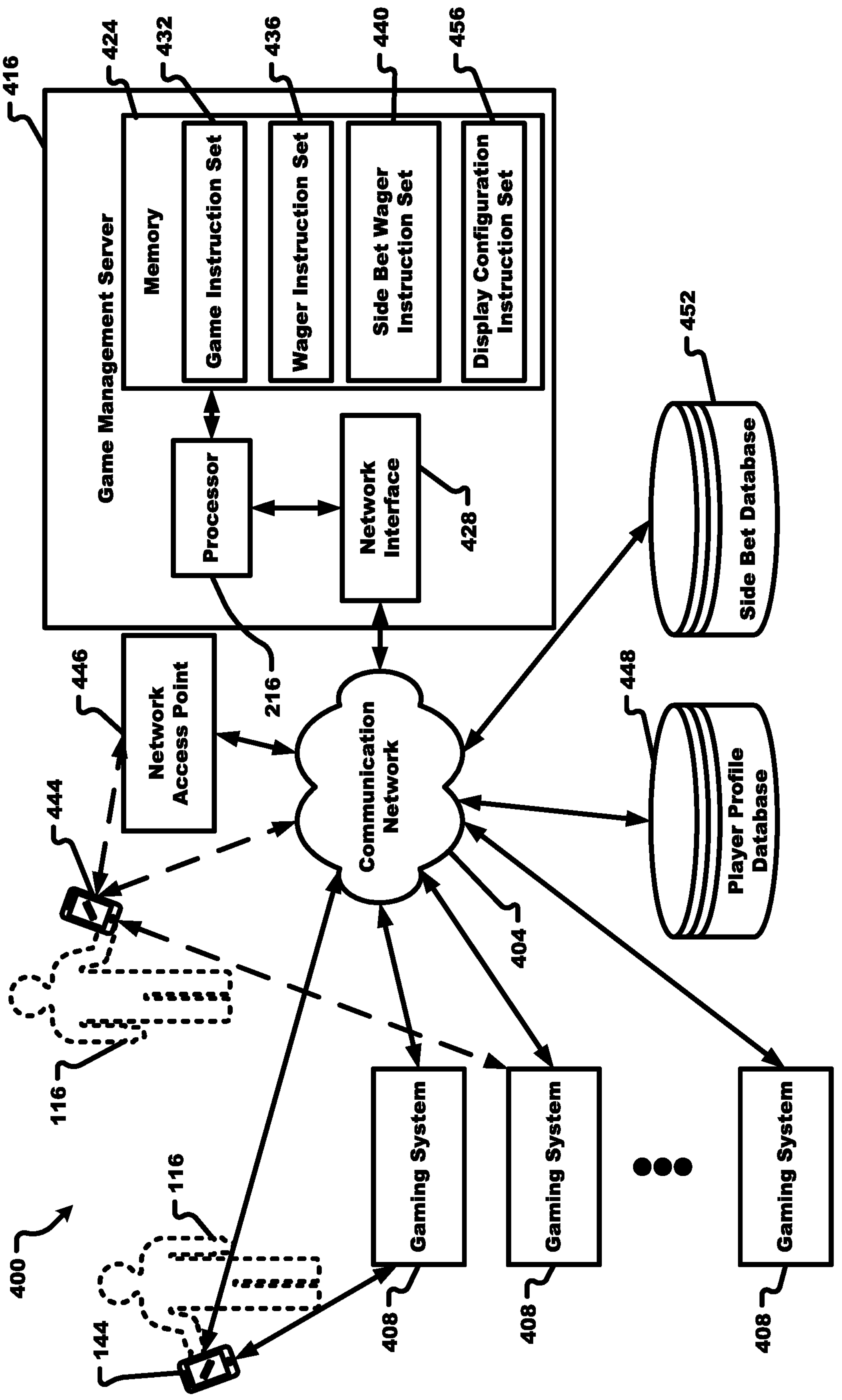
FIG. 4 is a block diagram depicting additional aspects of a gaming system in accordance with embodiments of the present disclosure.

With reference now to FIG. 4, details of an illustrative networked gaming system 400 will be described in accordance with at least one embodiment of the present disclosure. The components of the networked gaming system 400, while depicted as having particular instruction sets and devices, are not necessarily limited to the examples depicted herein. Rather, a networked gaming system 400 according to embodiments of the present disclosure may include one, some, or all of the components depicted in the networked gaming system 400 and does not necessarily need to include all of the components in a single device. For instance, the components of a server may be distributed amongst a plurality of servers and/or other devices (e.g., a gaming system, portable user device, etc.) in the networked gaming system 400 without departing from the scope of the present disclosure.

The networked gaming system 400 is shown to include a communication network 404 that interconnects and facilitates machine-to-machine communications between one or multiple electronic gaming systems 408, a player profile database 448, a side bet database 452, and a game management server 416. It should be appreciated that the communication (gaming) network 404 may correspond to one or many communication networks without departing from the scope of the present disclosure. In some embodiments, the various gaming systems 408 and game management server(s) 416 may be configured to communicate using various nodes or components of the communication network 404. The communication network 404 may comprise any type of known communication medium or collection of communication media and may use any type of protocols to transport messages between endpoints. The communication network 404 may include wired and/or wireless communication technologies. The Internet is an example of the communication network 404 that constitutes an Internet Protocol (IP) network consisting of many computers, computing networks, and other communication devices located all over the world, which are connected through many telephone systems and other means. Other examples of the communication network 404 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 404 need not be limited to any one network type, and instead may be comprised of a number of different networks and/or network types. Moreover, the communication network 404 may comprise a number of different communication media such as coaxial cable, copper cable/wire, fiber-optic cable, antennas for transmitting/receiving wireless messages, and combinations thereof.

In some embodiments, the gaming systems 408 may be distributed throughout a single property or premises (e.g., a single casino floor) or the gaming systems 408 may be distributed among a plurality of different properties. In a situation where the gaming systems 408 are distributed in a single property or premises, the communication network 404 may include at least some wired connections between network nodes. As a non-limiting example, the nodes of the communication network 404 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming systems 408 may utilize the same or different types of communication protocols to connect with the communication network 404. It should also be appreciated that the gaming systems 408 may or may not present the same type of game to players 116. For instance, a first gaming system 408 and a second gaming system 408 may correspond to gaming systems that present the same or different games. It may be possible for the some of the gaming systems 408 to communicate with one another via the communication network 404. In some embodiments, one or more of the gaming systems 408 may only be configured to communicate with a centralized management server (not shown) and/or the game management server 416. Although not depicted, the networked gaming system 400 may include a separate server or collection of servers that are responsible for managing the operation of the various gaming systems 408 in the networked gaming system 400. It should also be appreciated that the game management server 416 may or may not be co-located with one or more gaming systems 408 in the same property or premises. Thus, one or more gaming systems 408 may communicate with the game management server 416 over a WAN, such as the Internet. In such an event, a tunneling protocol or Virtual Private Network (VPN) may be established over some of the communication network 404 to ensure that communications between a gaming system 408 and a remotely-located server, such as the game management server 416, are secured. Additionally or alternatively, one or multiple gaming systems 408 may function as the game management server 416.

One, some, or all of the gaming systems 408 may correspond to a type of device that can enable a first player 116 to interact, via a gaming system 408, with a second player 116 and/or with a remotely located server, such as the game management server 416, in connection with playing games of chance and/or skill. A gaming system 408 may include any type of known gaming system such as a slot machine, a table game, an electronic table game (e.g., a card game such as video poker or a noncard game such as roulette or a dice game), a skill-based game, etc. While the gaming system 408 can be the ETG system 100, ETG system 200, or electronic gaming system 300, the gaming system 408 can be in any other form of EGM, virtual gaming machine, video game gambling machine (VGM), table game, ETG, or other computing device, personal gaming system, or collection of computing devices.

By way of example, the electronic gaming system 300, when networked as shown in FIG. 4, can provide to the player remote wagering games which may advantageously be played in addition to or instead of the live table games, even though the remote wagering games may have different wagers, different rules, or both.

For instance, the electronic gaming system 300, via the network 404, may provide the option for a player to enter into a live conventional blackjack game through its user interface 308. A player using electronic gaming system 300 may choose to participate in the live blackjack game or play a remote blackjack game in which the rules are different, such as the rules for dealing cards to reveal their value, or rules relating to the wager size (minimum, maximum, increment), or rules relating to payout associated with game symbols and symbol combinations, or rules allowing for a wild card, or in a blackjack variant in which the rules differ in any way from conventional blackjack. The cards dealt in the live game are correlated by the electronic gaming system 300 with the cards to be received in the remote wagering game according to its rules to resolve all wagers placed in the remote wagering game.

The electronic gaming system 300, via the network 404, can be responsive to an additional request for randomly generated game play data which may be necessary for resolving a remote wagering game. For example, the electronic gaming system 300 may inform the dealer at a live table game (such as played using the ETG system 100 of FIG. 1) to continue to deal a certain number of randomly shuffled cards above the amount needed to resolve the live table game, or the electronic gaming system 300 may be in communication with a random number generator (such as generated by ETG system 200 of FIG. 2 or internally by the gaming system 300) for the purpose of generating any amount of random gaming symbols necessary to match the amount necessary in the remote wagering game or add on to the random gaming symbols acquired from the live table game.

The networked electronic gaming system 300 can provide the option for the player to enter into a live conventional blackjack or play a remote blackjack game which includes one or more side bet wagers. The player may place the side bet wager through the electronic gaming system 300. The randomly generated gaming symbols received via the gaming network (not shown) will be compared via the processor with criteria for determining the outcome of the stored side bet wager. If the requisite gaming symbols have been received then the criteria will be satisfied and the side bet wager will be won. For example, a remote blackjack game may allow for the player to wager on receiving a hand that has achieved a poker rank such as a pair. The randomly generated gaming symbols dealt in the live conventional blackjack game on another gaming system 408 are received and compared with the criteria that the gaming symbols corresponding to the player's hand in the remote blackjack game comprise two cards of the same rank.

In addition to playing games on a gaming system 408, the players 116 may also be allowed to interact with and play games of chance and/or skill on respective mobile devices 444. A mobile device 444 may correspond to a player's 116 personal device (e.g., a smartphone) or to a device issued to the player 116 during the player's visit at a particular casino. It should be appreciated that the player 116 may play games directly on their mobile device 444 and/or the mobile device 444 may be in communication with a gaming system 408 such that the mobile device 444 provides the human-to-machine interface for the player 116 to the gaming system 408. The mobile device 444 may be in communication with the communication network 404, directly or via a network access point 446, or in direct communication (e.g., via Bluetooth, WiFi, etc.) with a gaming system 408. Non-limiting examples of a mobile device 444 include a cellular phone, a smart phone, a tablet, a wearable device, an augmented reality headset, a virtual reality headset, a laptop, a Personal Computer (PC), or the like.

The game management server 416 is further shown to include a processor 216, memory 424, and a network interface 428. These resources may enable functionality of the game management server 416 as will be described herein. For instance, the network interface 428 provides the server 416 with the ability to send and receive communication packets or the like over the communication network 404. The network interface 428 may be provided as a network interface card (NIC), a network port, drivers for the same, and the like. Communications between the components of the server 416 and other devices connected to the communication network 404 may all flow through the network interface 428.

The processor 216 may correspond to one or many computer processing devices. For instance, the processor 216 may be provided as silicon, as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor 216 may be provided as a microprocessor, Central Processing Unit (CPU), or plurality of microprocessors that are configured to execute the instructions sets stored in memory 424.

The memory 424 may include any type of computer memory device or collection of computer memory devices. The memory 424 may be volatile or non-volatile in nature and, in some embodiments, may include a plurality of different memory devices. Non-limiting examples of memory 424 include Random Access Memory (RAM), Read Only Memory (ROM), flash memory, Electronically-Erasable Programmable ROM (EEPROM), Dynamic RAM (DRAM), etc. The memory 424 may be configured to store the instruction sets depicted in addition to temporarily storing data for the processor 216 to execute various types of routines or functions. Although not depicted, the memory 424 may include instructions that enable the processor 216 to store data into a player profile database 448 and/or side bet database 452 and retrieve information from the databases. Alternatively or additionally, the player profile database 448 or data stored therein may be stored internal to the server 416 (e.g., within the memory 424 of the server 416 rather than in a separate database). Alternatively or additionally, the side bet database 452 or data stored therein may be stored internal to the server 416.

Illustrative instruction sets that may be stored in memory 424 include, without limitation, a game instruction set 432, a wager instruction set 436, a side bet wager instruction set 440, and a display configuration instruction set 456. Functions of the server 416 enabled by these various instruction sets will be described in further detail herein. It should be appreciated that the instruction sets depicted in FIG. 4 may be combined (partially or completely) with other instruction sets or may be further separated into additional and different instruction sets, depending upon configuration preferences for the server 416. Said another way, the particular instruction sets depicted in FIG. 4 should not be construed as limiting embodiments described herein.

In some embodiments, the game initiation set 432, when executed by the processor 216, may enable the game management server 416 to generate a gaming session for one or more players 116 or enable one or more players 116 to access remotely, participate in, or otherwise play a gaming session on another gaming system 408. The gaming session can be an automated (e.g., using pseudo-random or random number generated symbols, characters, or outcomes) or a live gaming session, such as a card or non-card gaming session. In some embodiments, the game instruction set 432, when executed by the processor 216, may enable the game management server 416 to facilitate one or more games of chance or skill and produce interactions between a player 116 or group of players and the game of chance or skill. In some embodiments, the game instruction set 432 may include subroutines that present one or more graphics to the player 116 or group of players, subroutines that calculate whether a particular wager has resulted in a win or loss during the game of chance or skill, subroutines for determining payouts for each player 116 in the event of a win, subroutines for exchanging communications with a connected gaming system 408, subroutines for enabling the player 116 or group of players to engage in a game using their mobile device 444, and any other subroutine or set of instructions that facilitate gameplay at or in association with the gaming system 408.

In some embodiments, the wager instruction set 436, when executed by the processor 216, may enable the game management server 416 to receive and process wagers by players and adjust player accounts to reflect gaming session outcomes (e.g., to increment a player's account to reflect awards realized from a wager on a winning outcome or decrement a player's account to reflect losses from a wager on a losing outcome of the gaming session).

The side bet wager instruction set 440, when executed by the processor 216, may enable the game management server 416 to receive from players 116 and enable and store for each of the players 116 the corresponding player-selected subset of side bets and display configurations. The side wager instruction set 440, when executed by the processor 216, may enable the game management server 416 to retrieve and cause the display of, for a selected gaming session to be played by a player, the corresponding player-selected subset of side bets in a desired display configuration and to change the player-selected set of side bets in accordance with commands received from the player through a user interface.

The display configuration instruction set 456, when executed by the processor 216, may enable the game management server 416 to generate and provide to the gaming system 408 display configurations and associated content for display to a player.

Figure 5:
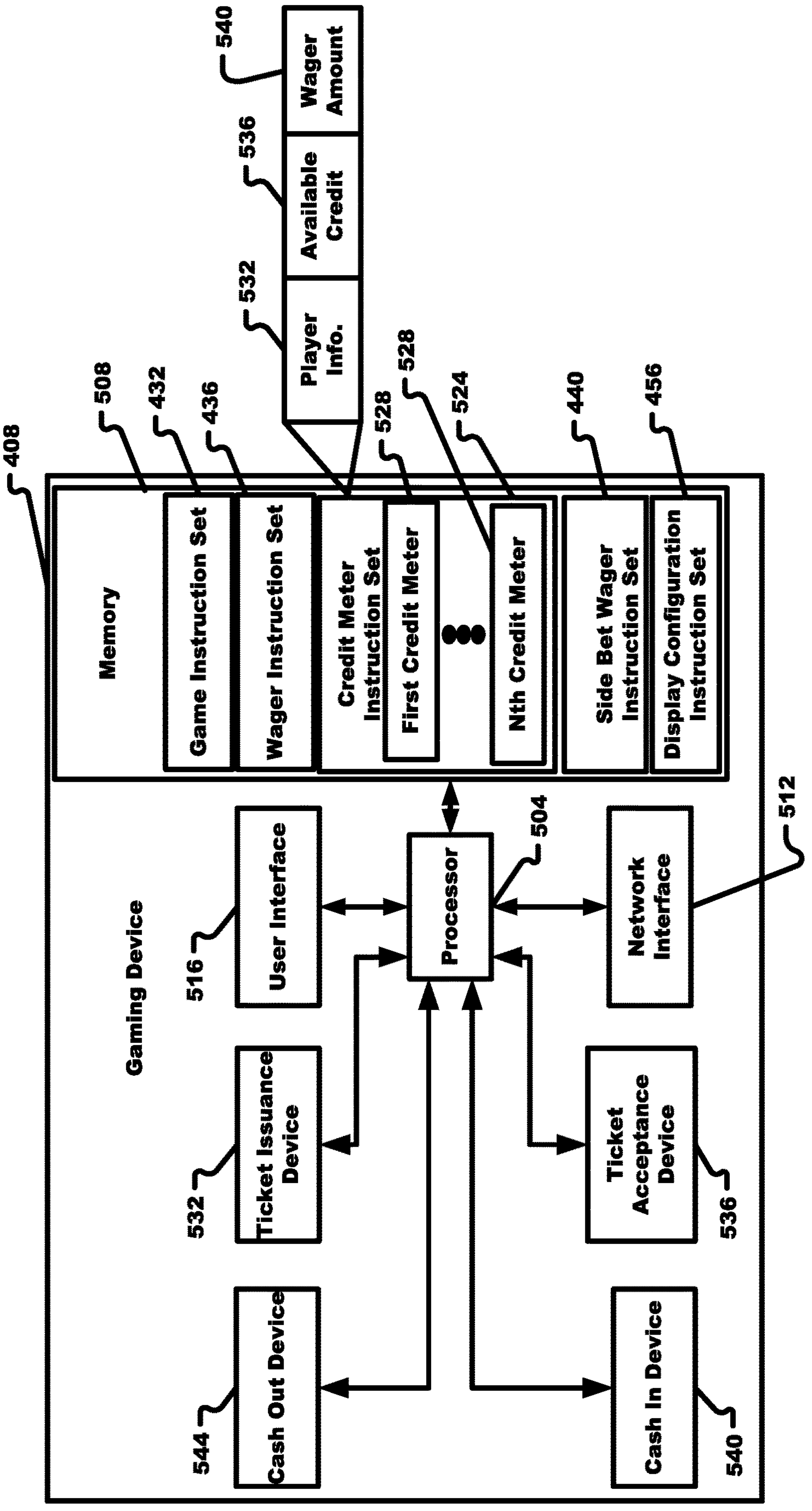
FIG. 5 is a block diagram depicting details of an electronic gaming machine in accordance with embodiments of the present disclosure.

With reference now to FIG. 5, additional details of a gaming system 408 will be described in accordance with at least some embodiments of the present disclosure. The gaming system 408, for example, can be a player gaming station 112 in FIG. 1 or 2 or the gaming system 300 of FIG. 3. While depicted as a gaming system 408, it should be appreciated that some or all of the components of the gaming system 408 may be included in a player's 116 mobile device 444 without departing from the scope of the present disclosure.

The gaming system 408 is depicted to include a processor 504, memory 508, a network interface 512, and a user interface 516. In some embodiments, the processor 504 may be similar or identical to the processor 216. In other words, the processor 504 may correspond to one or many microprocessors, CPUs, microcontrollers, or the like. The processor 504 may be configured to execute one or more instruction sets stored in memory 508.

The network interface 512 may also be similar or identical to network interface 428. The nature of the network interface 512, however, may depend upon whether the network interface 512 is provided in a gaming system 408 or a mobile device 444. Examples of a suitable network interface 512 include, without limitation, an Ethernet port, a USB port, an RS-232 port, an RS-485 port, a NIC, an antenna, a driver circuit, a modulator/demodulator, etc. The network interface 512 may include one or multiple different network interfaces depending upon whether the gaming system 408 is connecting to a single communication network 404 or multiple different types of communication networks 404. For instance, the gaming system 408 may be provided with both a wired network interface and a wireless network interface without departing from the scope of the present disclosure.

The user interface 516 may correspond to any type of input and/or output device that enables the player 116 to interact with the gaming system 408. As can be appreciated, the nature of the user interface 516 may depend upon the nature of the gaming system 408. For instance, if the gaming system 408 is a traditional mechanical reel slot machine, then the user interface 516 may include one or more mechanical reels with symbols provided thereon, one or more lights or LED displays, one or more depressible buttons, a lever or "one armed bandit handle", a speaker, or combinations thereof. If the gaming system 408 is a digital device, then the user interface 516 may include one or more touch-sensitive displays, LED/LCD display screens, etc. Examples of this type of gaming system and associated displays include the ETG system 100 and associated table control console 132, common display 120, and electronic display 124, the ETG system 200 and associated main table display 208 and the electronic displays 124 in the player station systems 112, and the electronic gaming system 300 and associated display 312.

The memory 508 may be similar or identical to memory 424. For instance, the memory 508 may include one or multiple computer memory devices that are volatile or non-volatile. The memory 508 may be configured to store instruction sets that enable player interaction with the gaming system 408, that enable game play at the gaming system 408, and/or that enable coordination with the game management server 416. Examples of instruction sets that may be stored in the memory 508 include the game instruction set 432, wager instruction set 436, credit meter instruction set 524, side bet wager instruction set 440, and display configuration instruction set 456.

The credit meter instruction set 524 may correspond to a secure instruction set within the gaming system 408 that creates one or more credit meters 528 to track activity at the gaming system 408, such as an amount of money or number of credits a player can use on the gaming system 408. The types of information that may be maintained by the credit meter instruction set 524 in each credit meter 528 includes, without limitation, player information 532, available credit information 536, wager amount information 540, and other types of information that may or may not need to be recorded for purposes of accounting for wagers placed at the gaming system 408 and payouts made for a player 116 during a game of chance or skill played at the gaming system 408. In some embodiments, the credit meter instruction set 524 may be configured to track coin in activity, coin out activity, coin drop activity, jackpot paid activity, mini bonus paid activity, credits applied activity, external bonus payout activity, voucher in activity, voucher out activity, timing of events that occur at the gaming system 408, and the like. In some embodiments, the credit meter instruction set 524 may update a credit meter 528 in response to outcomes of a game of chance or skill played at the gaming system 408 or the gaming system 408 of another player member, such as a side bet on a gaming session played by one or more different players on a different gaming system 408.

In some embodiments, a respective credit meter 528 may be instantiated for each of the side bets in a player-selected subset of side bets. Each of the credit meters 528 for a given player-selected subset of side bets can include common player information 532, respective available credit 536, and respective (side bet) wager amount 540. As will be appreciated, the available credit 536 and side bet wager amount 540 for each of the credit meters 528 for a selected player can be the same or different, depending on the gaming session and player activities.

Figures 6A, 6B:
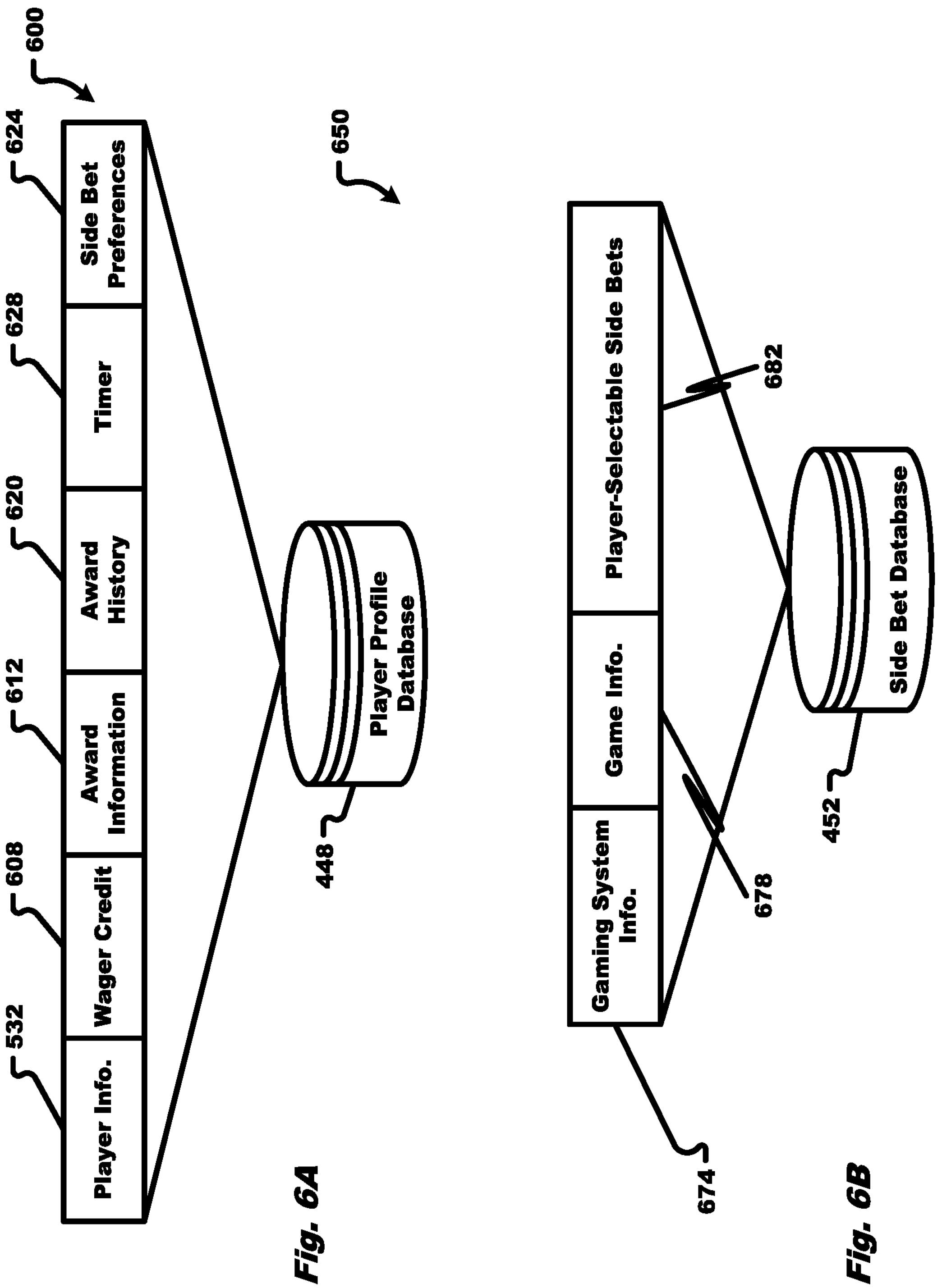
FIG. 6A is a block diagram depicting an illustrative data structure used in a player profile database in accordance with embodiments of the present disclosure.
FIG. 6B is a block diagram depicting an illustrative data structure used in a side bet database in accordance with embodiments of the present disclosure.

With reference now to FIG. 6A, additional details of data that may be stored in the player profile database 448 will be described in accordance with at least some embodiments of the present disclosure. The database 448 may be configured to store one or multiple data structures 600 that are used in connection gaming activities of a player. In some embodiments, the data stored in the data structures 600 may be stored for a plurality of different player profiles or for a single player profile. The data structure 600 may include a plurality of data fields that include, for instance, a player information field 532, a wager credit field 608, an award information field 612, an award history field 620, a timer field 628, and a side bet preferences field 624.

The player information field 532 may be used to store any type of information that identifies a player. In some embodiments, the player information field 532 may store one or more of username information for a player 116, contact information for the player (such as email address, phone number, social website webpage universal resource locator, and the like), password information for a player account, player status information, accommodations associated with the player 116, and any other type of customer service management data that may be stored with respect to a player 116.

The wager credit field 608 may be used to store data about a player's 116 available credit with a casino or a plurality of casinos. For instance, the wager credit field 608 may store an electronic record of available credit in the player's account and whether any restrictions are associated with such credit. The wager credit field 608 may further store information describing a player's available credit over time, wagers made over time, cash out events for the player, winning events for the player, and the like.

The award information field 612 may be used to store information describing awards that have been paid to the player 116 or that are available to be paid in response to particular events occurring within the gaming system 100, 200, 300, or 408. As a non-limiting example, the award information field 612 may be used to store electronic records for values of awards that are available to or have been paid to the player 116.

The award history field 620 may store data related to awards, bonuses, mini bonuses, jackpots, side bets, etc. granted to the player 116. The award history field 620 may also indicate when such awards were granted to the player 116, whether the awards have been redeemed, whether the awards are being funded by a game of chance or skill, a mini bonus associated with an event, or a side bet award associated with the occurrence or nonoccurrence of an event. In one example, the particular event could be one or more of the gaming system 408 being in an idle state with no amount credited for a specified period of time, a player's failure to perform an activity within a specified period of time after a display to configure side bets is presented to a player, and the like.

The timer field 628 may be used to store a timer value associated with tracking whether or not a particular player 116 or the gaming system 408 has completed a particular event or a plurality of events within a predetermined amount of time. The value of the timer within the timer field 428 may count up, count down, or increment in any known way to track a passage of time. Alternatively or additionally, time may be measured by an occurrence of events within the gaming system 100, 200, 300, or 408 rather than being measured absolutely.

With reference now to FIG. 6B, additional details of data that may be stored in the side bet database 452 will be described in accordance with at least some embodiments of the present disclosure. As in the case of the player profile database 448, the database 452 may be configured to store one or multiple data structures 650 that are used in connection with tracking player side bet subset selections. In some embodiments, the data stored in the data structure 650 may be stored for a plurality of different gaming systems or for a single gaming system. The data structure 650 may include a plurality of data fields that include, for instance, a gaming system information field 654, game information field 678, and a player-selectable side bets field 682.

The gaming system information field 674 may be used to store any type of information that identifies a gaming system 408 either uniquely (e.g., by serial number, contact address, or other unique identifier) and/or by type (e.g., model).

The game information field 678 may be used to store any type of information that identifies the game and associated rule sets to be played on the gaming system 408 identified in the gaming system information field 674. Exemplary games include, for example, a card game such as blackjack, baccarat, or poker, a dice game such as craps or sic bo, and a roulette or wheel game.

The player-selectable side bets field 682 can include a list of side bets that is available for the gaming system 408 identified in the gaming system information field 674 and game identified in the game information field 678.

The gaming system information field 674, game information field 678, and player-selectable side bets field 682 can be selected by the casino (e.g., dealer) either before or during a gaming session.

The various fields in the data structures 650 enable each of the gaming systems 408 and games identified in the gaming system information field 674 and game information field 678, respectively, to have a different set of side bets listed in the corresponding player-selectable side bets field 682. Stated differently, for a common game type identified in the game information field 678 a first gaming system 408 identified in a first gaming system information field 674 can have a different set of side bets listed in the corresponding first player-selectable side bets field 682 compared to the set of side bets listed in a second player-selectable side bets field 682 for a second gaming machine 408 identified in a second gaming system information field 674. Conversely, a different set of player-selectable side bets listed in first and second player-selectable side bet fields 682 can be selected by the casino for a common game type identified in the corresponding first and game information fields 678 for a common type of gaming system 408 identified in the first and second gaming system information fields 674.

Figure 7:
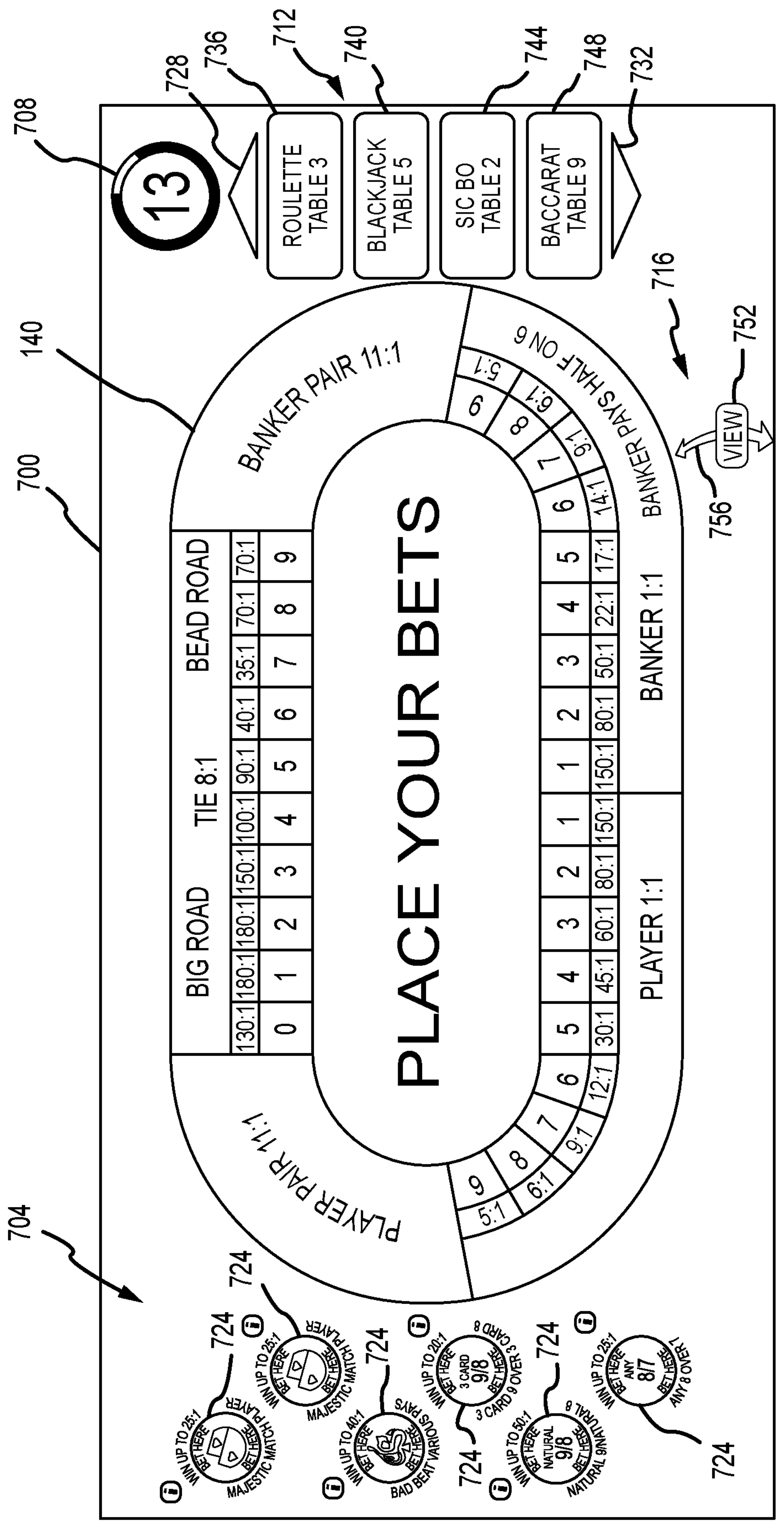
FIG. 7 is a user interface display in accordance with embodiments of the present disclosure.

With reference now to FIG. 7, an example of a display 700 for baccarat is presented in accordance with an embodiment. The display 700 comprises a player wagering zone or gaming chip placement zone 140, a side bet wagering zone or gaming placement zone 704, a wager cut off timer 708, a multi-game view 712, and a change table viewing angle control 716.

In one embodiment, the player wagering zone 140 can include a number of target wager locations 720 to receive gaming session wagers, such as wagers on the depicted traditional straight-up baccarat bets (e.g., player, banker, player pair, banker pair, and tie). The player wagering zone

140, in one embodiment, may include a gaming chip detection component (not shown) which may be adapted to automatically detect the presence and/or monetary amount of gaming chips which have been placed within a player's wagering zone, and the player wagering zone 140 may, in one embodiment, include icons or other symbols representing the presence and/or monetary amount of gaming chips placed on a separate physical surface, such as on a gaming table surface. The player wagering zone 140 may, in one embodiment, receive icons or other symbols representing the presence and/or monetary amount of gaming chips dragged and dropped by the player on the appropriate wager locations.

In one embodiment, the side bet wagering zone 704 can include a plurality of target side bet locations 724 to receive side bet wagers. Like the player wagering zone 140, the side bet wagering zone 704, in various embodiments, can include a gaming chip detection component (not shown) which may be adapted to automatically detect the presence and/or monetary amount of gaming chips which have been placed within a player's wagering zone; icons or other symbols representing the presence and/or monetary amount of gaming chips placed on a separate physical surface, such as on a gaming table surface; or receive icons or other symbols representing the presence and/or monetary amount of gaming chips v dragged and dropped by the player on the appropriate wager locations.

In one embodiment, the wager cut off timer 708 is a countdown or count-up timer depicting a time remaining for players to place wagers in one or both of the player wagering zone 140 and side bet wagering zone 704.

In one embodiment, the multi-game view 712 includes up and down scroll arrows 728 and 732, respectively, to enable the player to scroll through differing active gaming sessions played on differing gaming systems 408. The exemplary display of FIG. 7 depicts a first icon 736 identifying a roulette gaming session on roulette table 3 and providing gaming information associated with the corresponding roulette gaming session, a second icon 740 identifying a blackjack gaming session on blackjack table 5 and providing gaming information associated with the corresponding blackjack gaming session, a third icon 744 identifying a sic bo gaming session on sic bo table 2 and providing gaming information associated with the corresponding sic bo gaming session, and a fourth icon 748 identifying a baccarat gaming session on baccarat table 9 and providing gaming information associated with the corresponding baccarat gaming session. The up and down scroll arrows 728 and 732 enable the player to scroll up or down through a list of active gaming sessions to display icons pertaining to active gaming sessions on other gaming systems 408. By clicking or otherwise selecting a particular icon, the player can refresh the various fields of the display 708 to contain information in a new display mirroring that currently being provided to other players of the gaming session associated with the gaming session associated with the selected icon.

In one embodiment, the change table viewing angle control 716 adjusts the view of the board, so the player can select different viewing angles of the player (relative to a selected viewing position of the player) to place bets in the target wager and side bet locations 720 and 724. The change table viewing angle 716 can enable a player to view the objects depicted in the display at many angles including flat like a painting hanging on the wall or inclined at a desired angle relative to the viewing position of the player. The player, by manipulating a control icon 752 back-and-forth along an arc 756 (which indicates a viewing angle relative to a flat surface) can select a viewing angle of the displayed virtual playing surface relative to the viewing position of the player. This ability, for example, can enable the player to visualize more easily details of the gaming session compared to a fixed viewing angle alone (for example, an object such as a stack of chips can be viewed in side (or in two dimensions) or perspective view (or in three dimensions) depending on the position of the control icon 752 relative to the arc 756). In one embodiment, this result is realized by the change table viewing angle control 716 adjusting a camera angle in a forward, backward, left, and/or right direction as the control 716 is moved upwardly and downwardly along the arc 756.

Figure 8A:
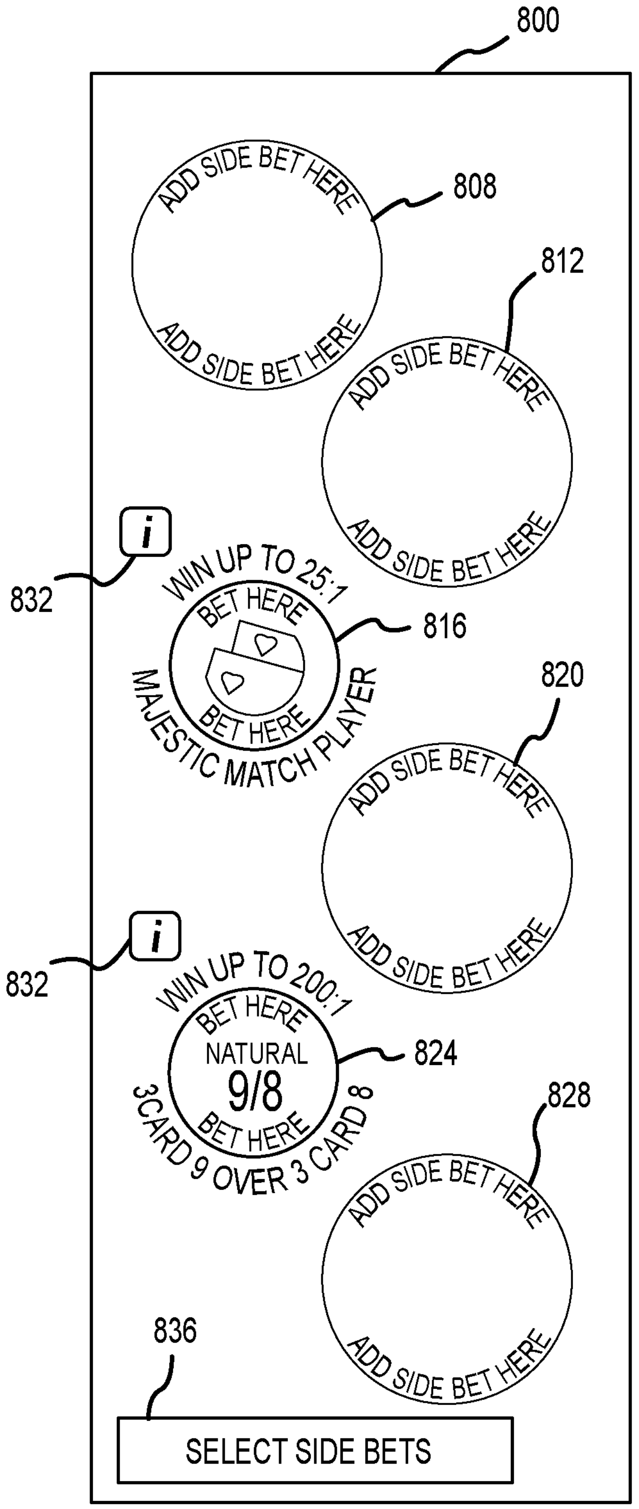
FIG. 8A is a portion of a user interface display in accordance with embodiments of the present disclosure.
Figure 8B:
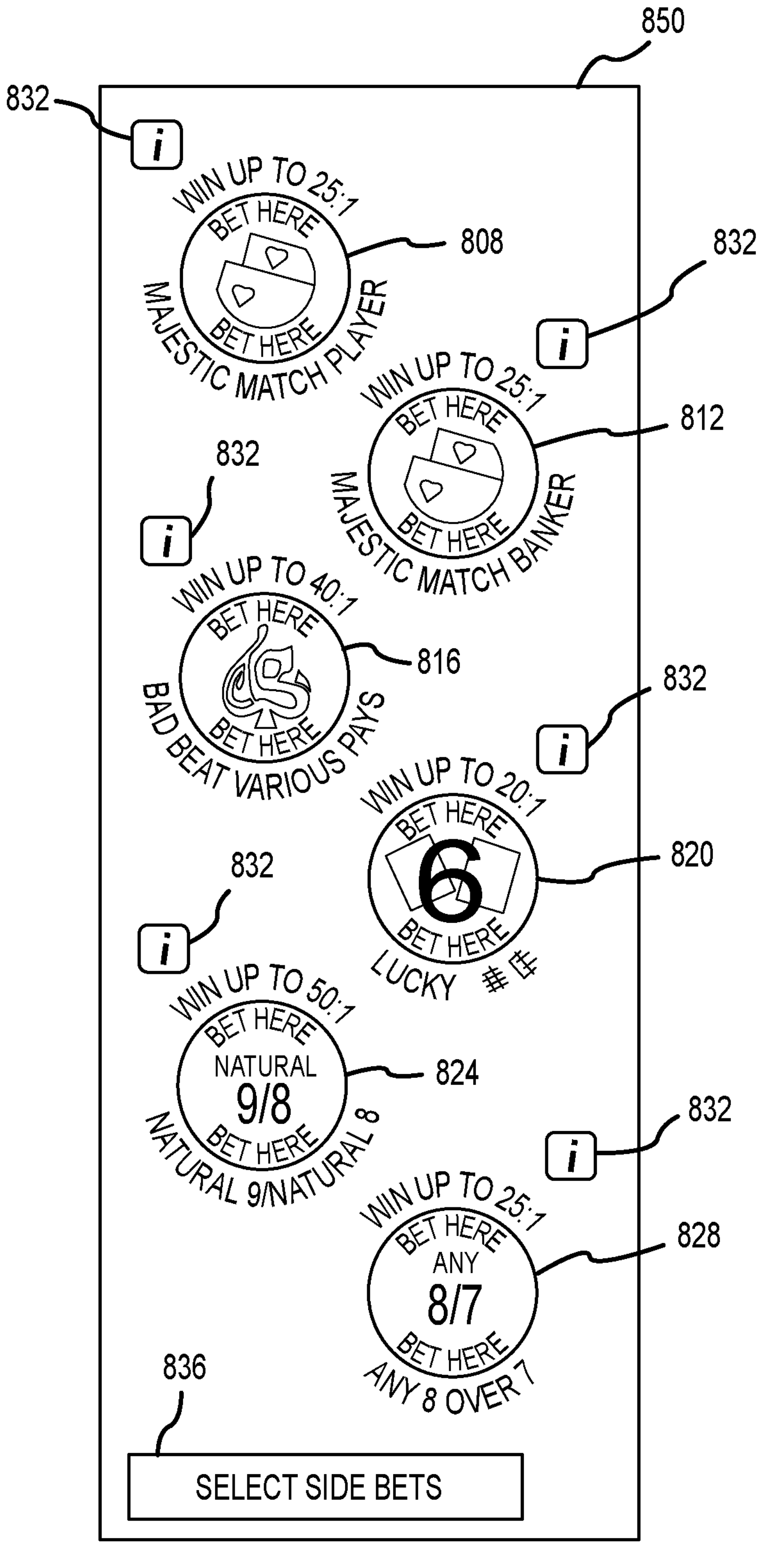
FIG. 8B is a portion of a user interface display in accordance with embodiments of the present disclosure.

Referring to FIGS. 8A and 8B, the player selection of a customized player-selected set of side bets in the side bet wagering zone 704 will be described. FIG. 8A depicts a partially side bet populated side bet wagering zone 800 while FIG. 8 B depicts a fully side bet populated side bet wagering zone 850. Each of the side bet wagering zones 800 and 850 comprise a plurality of disk-shaped target side bet locations 808, 812, 816, 820, 824, and 828 that are configured to receive a similarly disk-shaped icon corresponding to a particular side bet. While FIGS. 8A and 8B depict six disk-shaped target side bet locations 808, 812, 816, 820, 824, and 828, it is to be understood that any number of target side bet locations of any shape may be employed. In FIG. 8A, the third and fifth target side bet locations 816 and 824 are populated by a respective side bet icon while the remaining first, second, fourth, and sixth target side bet locations 808, 812, 820, and 828 are unoccupied as indicated by the legend "ADD SIDE BET HERE" in each of the first, second, fourth, and sixth target side bet locations 808, 812, 820, and 828. In the side bet wagering zone 850 of FIG. 8B by contrast, all of the first, second, third, fourth, fifth, and sixth target side bet locations 808, 812, 816, 820, 824, and 828 are occupied by a different respective side bet icon. A selectable field 832 is depicted adjacent to each of the side bet icons. The selectable field 832 can display an "i" (as shown) that, if selected by the player, displays information describing the corresponding side bet (such as the side bet name ("Majestic Match Banker") odds of winning ("25:1"), and a description of how a player accomplishes a winning outcome) or an "x" that, if selected by the player, removes the side bet icon and renders the corresponding target side bet location vacant (such as the first, second, fourth, and sixth target side bet locations 808, 812, 820, and 828 of FIG. 8A) to be occupied by a different side bet icon selected by the player from the player-selectable set of side bets.

A dropdown list of the player-selectable set of side bets is provided to the player in response to selecting the SELECT SIDE BETS request 836 to enable the player to populate each of the first, second, third, fourth, fifth and sixth target side bet locations 808, 812, 816, 820, 824, and 828. The set of the player-selectable side bets commonly has a larger number of side bet members than the subset of player-selected side bets occupying the first, second, third, fourth, fifth and sixth target side bet locations 808, 812, 816, 820, 824, and 828.

In one embodiment, the player drags an icon or other object representing a selected side bet from the dropdown list of the side bet members in the player-selectable set of side bets and drops, or otherwise positions the side bet object, on a selected one of the first, second, third, fourth, fifth and sixth target side bet locations 808, 812, 816, 820, 824, and 828. In one application, this requires the player to: move a pointer or other indicator to the selected side bet object, press, and hold down, the button on a mouse, trackball, or other pointing device to "grab" the side bet object, "drag" or spatially move the selected side bet object to the desired target side bet location by moving the pointer to the desired target side bet location, and "drop" the side bet object by releasing the button. The processor 216 or 504 identifies these operations commonly by an event handler detecting an event associated with each operation. For example, the target side bet location upon which the dragged side bet object is released on causes in response to the drop command an event to be generated. The processor then retrieves information associated with the dropped side bet object (typically a path to a file associated with the dropped side bet object (such as the data structures 650 in the side bet database 452 associated with the selected side bet) and acts on it. Alternatively, the processor can retrieve information from a container, such as on ObjectBag, that contains a category of the associated side bet object, a class of the associated side bet object, and an instance of the associated side bet object. Likewise, the processor can process the side bet object selection and/or drag operations by detecting an event associated with each operation. The processor will determine an action type to be undertaken (e.g., copying, moving, and so on) as a result of the drag-and-drop process and perform the action type. Commonly, the action type can be determined from the trigger event with its modifiers. If the selected side bet object is to be copied or linked, the processor can invoke a different method than the method invoked for moving the selected side bet object from the location of the dropdown list of the player selectable set of side bets to the selected target side bet location. In the latter case, the method may require a transfer-session method to handle a drag-and-drop session and delete-sources method to delete the original side bet object, thereby providing the player with the impression that the side bet object has been moved from the location of the dropdown list of the player-selectable set of side bets to the selected target side bet location.

Alternatively, the selected side bet object can be moved without dragging simply by using the pointer to select the side bet object from the player-selectable set of side bets and, after moving the pointer to the selected target side bet location, indicating to the processor that the pointer is at the desired location for the selected side bet object. This is similar to a cut-and-paste operation.

In one embodiment, the dropdown list of player-selectable side bets can be opened on the selected target side bet location and the specific side bet object to populate the selected target side bet location chosen from the dropdown list. In response to the selection of the specific side bet object, the icon associated with the specific side bet object will be displayed at the selected target side bet location.

While dragging requires more physical effort than moving the same pointing device without holding down any buttons or selecting the side bet object from a list of side bets in the player-selectable set of side bets at the target side bet location, drag-and-drop operations have the advantage of thoughtfully chunking together two operands (the object to drag and the drop location) into a single action. As will be appreciated, other techniques and methods can be employed to relocate the selected side bet object at the selected target side bet location.

Normally, a number of side bets in the player-selected subset of the player-selectable set of side bets in the side bet wagering zone 704 is less than a number of side bets in the player-selectable set of side bets. The number of side bets permitted in the side bet wagering zone 704 can be player-configurable or casino-configurable (e.g., dealer-configurable) or both. In a common gaming session involving multiple players, a first subset of the player-selectable set of side bets enabled for the first player in a multi-player group of the players and a second subset of the player-selectable set of side bets enabled for a second player in the multi-player group can contain different numbers of or types of side bets.

In the common gaming session involving multiple players, the respective side bets in a player-selected subset of the player-selectable set of side bets in a side bet wagering zone 704 of a first player can be the same as or different from the respective side bets in a player-selected subset of the player-selectable set of side bets in a side bet wagering zone 704 of a second player. Stated another way, the side bets in a first subset of the player-selectable set of side bets selected by the first player in the multi-player group is different from side bets in the second subset of the player-selectable set of side bets selected by the second player in the multi-player group. For example, a side bet in the first subset of the player-selectable set of side bets selected by the first player is not in the second subset of the player-selectable set of side bets selected by the second player.

In the common gaming session involving multiple players, the displayed configuration or arrangement of the respective side bets in a player-selected subset of the player-selectable set of side bets in a side bet wagering zone 704 of the first player can be the same as or different from the displayed configuration or arrangement of the respective side bets in a player-selected subset of the player-selectable set of side bets in a side bet wagering zone 704 of the second player. Stated another way, for first and second subsets of player-selected side bets having identical side bet membership, the first subset of the player-selectable set of side bets selected by the first player in the multi-player group can be displayed in a configuration or arrangement different from that displayed for the second subset of the player-selectable set of side bets selected by the second player in the multi-player group.

Figure 9:
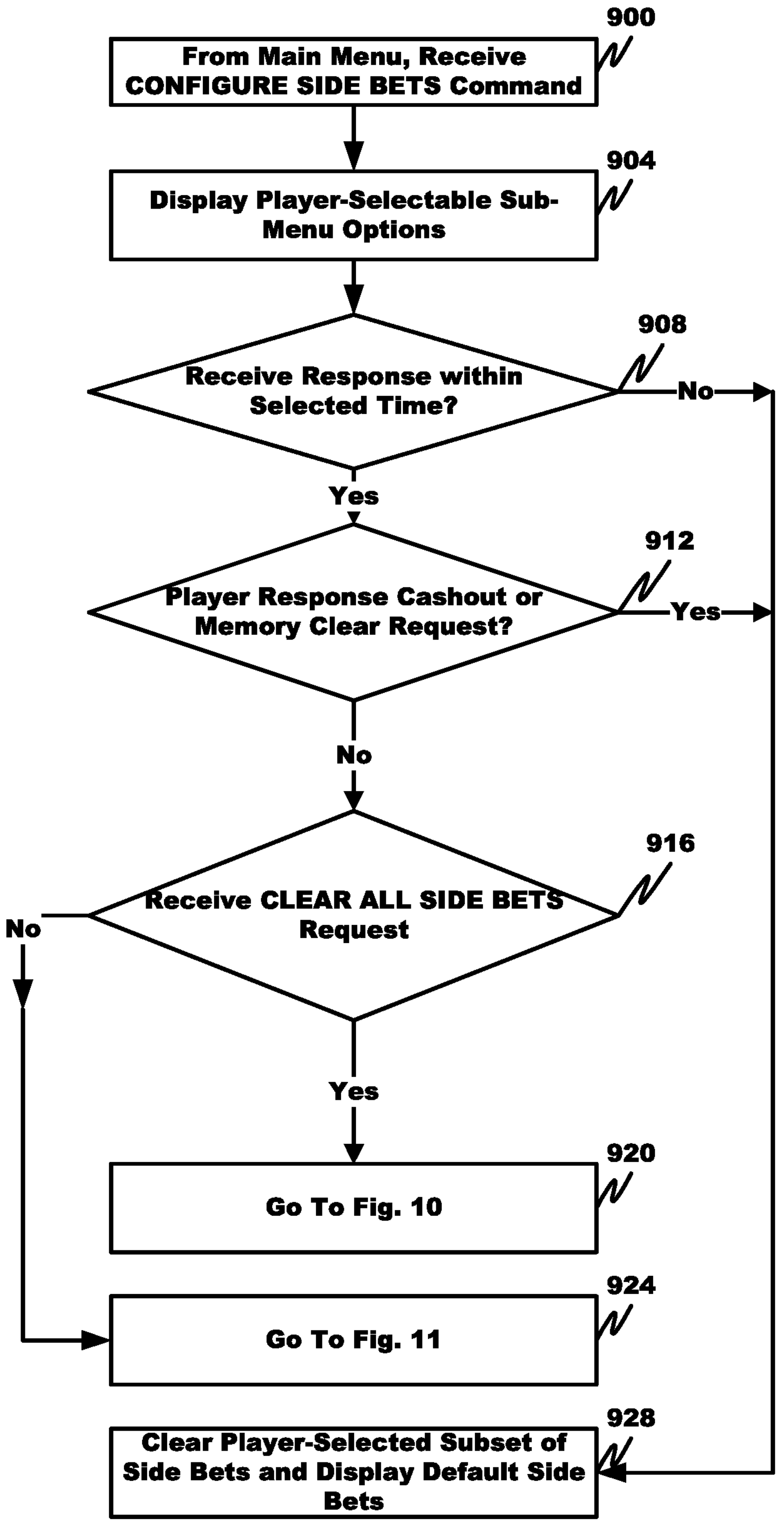
FIG. 9 is a flow diagram depicting a method of configuring side bets in accordance with embodiments of the present disclosure.

With reference to FIG. 9, a method of configuring a side bet wagering zone 704 will be described in accordance with embodiments of the present disclosure.

The method begins in step 900 when a player 116 selects a CONFIGURE SIDE BETS request from an electronic display 124, player input interface 128, or other user interface 516, and the command is received by the processor 216 or 504.

The method continues by the processor 216 or 504 providing to the player 116 a display, via the electronic display 124, player input interface 128, or other user interface 516, of player-selectable sub-menu options. The options include a cashout request, memory clear request, CLEAR ALL SIDE BETS, and EDIT SIDEBETS request.

The method continues, in decision diamond 908, by the processor determining whether a player 116 response has been received within a selected time (e.g., the timer value may be stored in the timer field 638 of the data structures 600). In one configuration, the processor determines if the gaming system 408 is in an idle state with no amount credited for a selected time period (e.g., 60 seconds).

If a player 116 response has been received within the selected time, the method continues, in decision diamond 912, by the processor 216 or 504 determining whether the player response is a cashout request, such as by pushing a cashout button, or a memory clear request.

If no player 116 response is received within a selected time or if the player response is a cashout request or a memory clear request, the processor 216 or 504, in step 928, clears the player-selected subset of side bets and reverts the side bets displayed in a side bet wagering zone 704 (and associated with the first, second, third, fourth, fifth and sixth target side bet locations) to a default set of side bets, such as to a universally presented type and arrangements of side bets.

Figure 10:
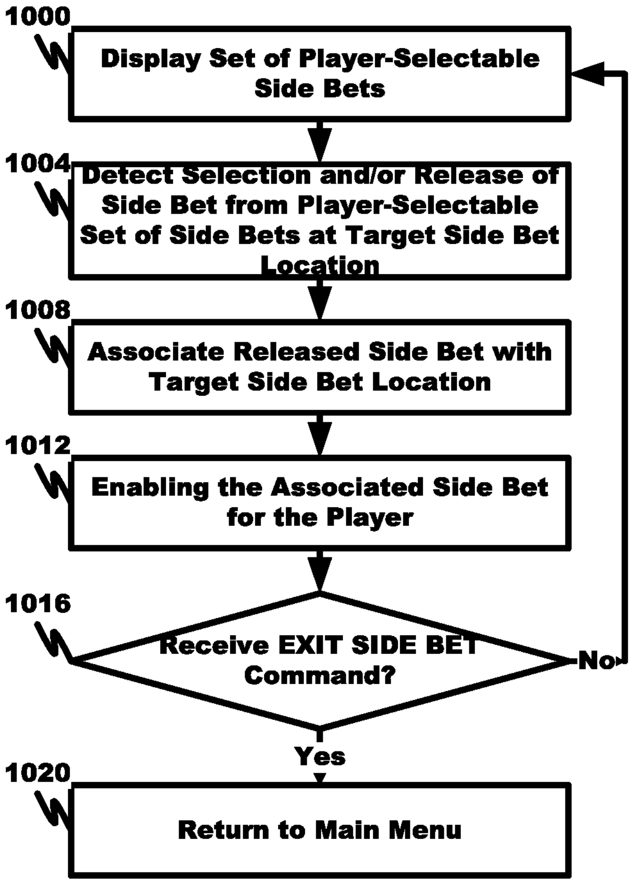
FIG. 10 is a flow diagram depicting a method of configuring side bets in accordance with embodiments of the present disclosure.

If the response is a CLEAR ALL SIDE BETS request, the processor 216 or 504 executes the process flow set forth in FIG. 10. If the response is not a CLEAR ALL SIDE BETS request, the processor 216 or 504 executes the process flow set forth in FIG. 11.

With reference now to FIG. 10, a method of adding player-selected side bets to the side bet wagering zone 704 will be described in accordance with embodiments of the present disclosure.

The method begins in step 1000 of FIG. 10 with the processor causing the display, via the electronic display 124, player input interface 128, or other user interface 516, of the set of player-selectable side bets, such as by a dropdown list displayed within or in spatial proximity to the side bet wagering zone 704. Each of the target side bet locations 808, 812, 816, 820, 824, and 828 further is empty, or has no corresponding side bet icon displayed (and is not associated with any side bet in the player-selectable set of side bets). Instead, each of the target side bet locations 808, 812, 816, 820, 824, and 828 displays the language "ADD SIDE BET HERE" (as shown in FIG. 8A).

In step 1004, the processor detects the selection and/or release of a side bet in the player-selectable set of side bets at a target side bet location 808, 812, 816, 820, 824, and 828.

The method continues in step 1008 with the processor associating the released side bet with the particular target side bet location. This is typically done by modifying the side bet preferences field 624 of the data structures 600 (FIG. 6A) to link the target side bet location with the released side bet.

The method continues in step 1012 with the processor enabling the associated side bet for the player in the upcoming or currently active gaming session. While enablement can include any set of operations apparent to one of ordinary skill in the art, enablement, in one embodiment, is done by instantiating a credit meter 528 for the associated side bet.

The method continues in decision diamond 1016 with the processor determining whether the EXIT SIDE BET command has been received. If so, the processor returns to the main menu of FIG. 9. If not, the processor returns to step 1000 to await the next side bet selection from the player.

Figure 11:
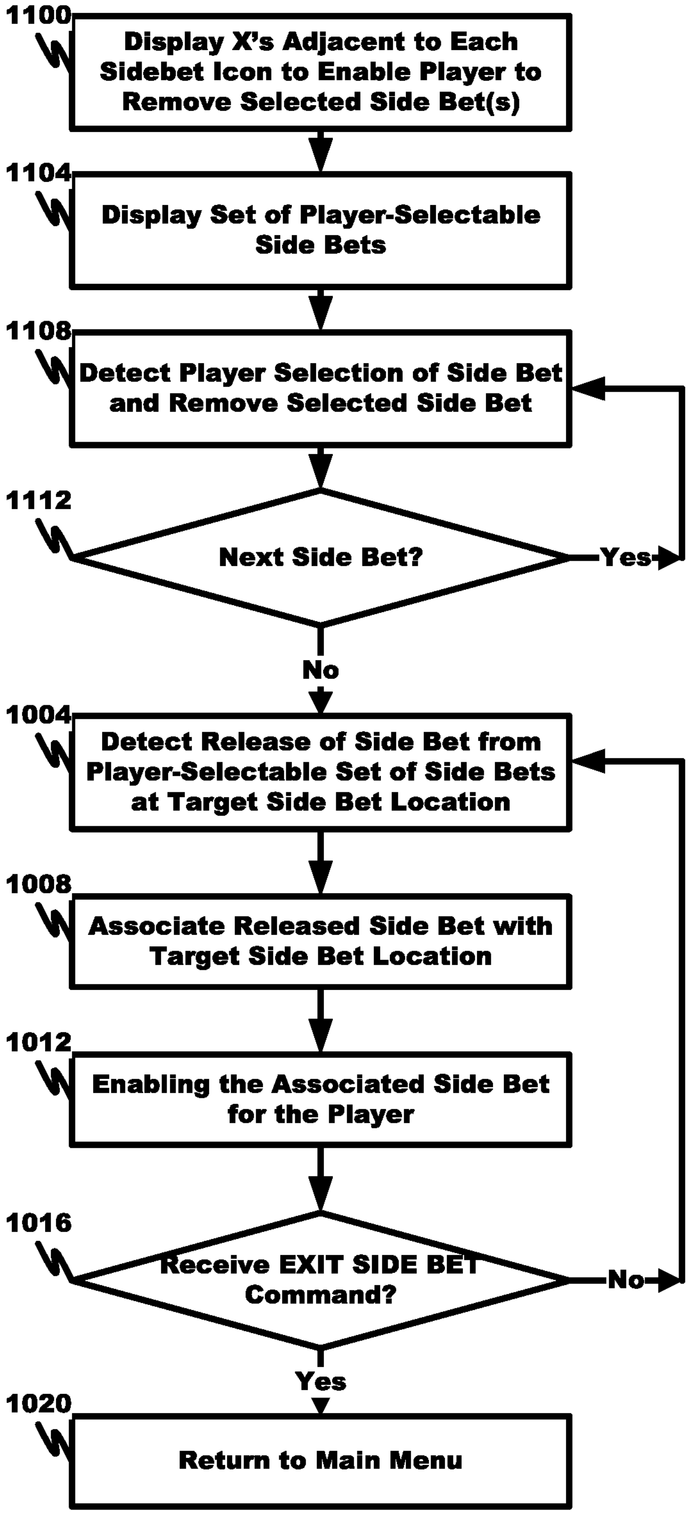
FIG. 11 is a flow diagram depicting a method of configuring side bets in accordance with embodiments of the present disclosure.

With reference now to FIG. 11, a method of editing the side bet wagering zone 704 will be described in accordance with embodiments of the present disclosure.

The method begins in step 1100 of FIG. 11 with the processor causing the display, via the electronic display 124, player input interface 128, or other user interface 516, of the set of player-selectable side bets, such as by a dropdown list displayed within or in spatial proximity to the side bet wagering zone 704. One or more of the target side bet locations 808, 812, 816, 820, 824, and 828 further is occupied by a player-selected or default side bet icon, though some of the target side bet locations 808, 812, 816, 820, 824, and 828 may be empty, or have no corresponding side bet icon displayed. Instead, each of the unoccupied target side bet locations 808, 812, 816, 820, 824, and 828 displays the language "ADD SIDE BET HERE" (as shown in FIG. 8A).

The method continues in step 1104 with the processor 216 or 504 causing the display in the selectable field 832 of an "x" rather than an "i" (as shown in FIG. 8B) of the occupied target side bet locations. If the "x" is selected by the player, the processor removes the side bet icon and renders the corresponding target side bet location vacant or unoccupied (as shown in FIG. 8A) to be occupied by a different side bet icon selected by the player from the player-selectable set of side bets.

The method continues, in step 1104, by the processor 216 or 504 causing the display, via the electronic display 124, player input interface 128, or other user interface 516, of the set of player-selectable side bets, such as by a dropdown list displayed within or in spatial proximity to the side bet wagering zone 704.

The method continues, in step 1108, by the processor detecting the player selection of an "x" in the selectable field 832 and removing or causing the removal of the corresponding side bet icon to make the target side bet location unoccupied.

The method continues, in decision diamond 1112, by the processor determining whether (within a specified value of the timer field 628) there is a next side bet for which the selectable field 832 has been selected. If so, the processor returns to and repeats step 1108. If not, the processor proceeds to step 1004.

The ensuing steps 1004, 1008, 1012, 1016, and 1020 have been described with reference to FIG. 10 above and will not be repeated.

Figure 12:
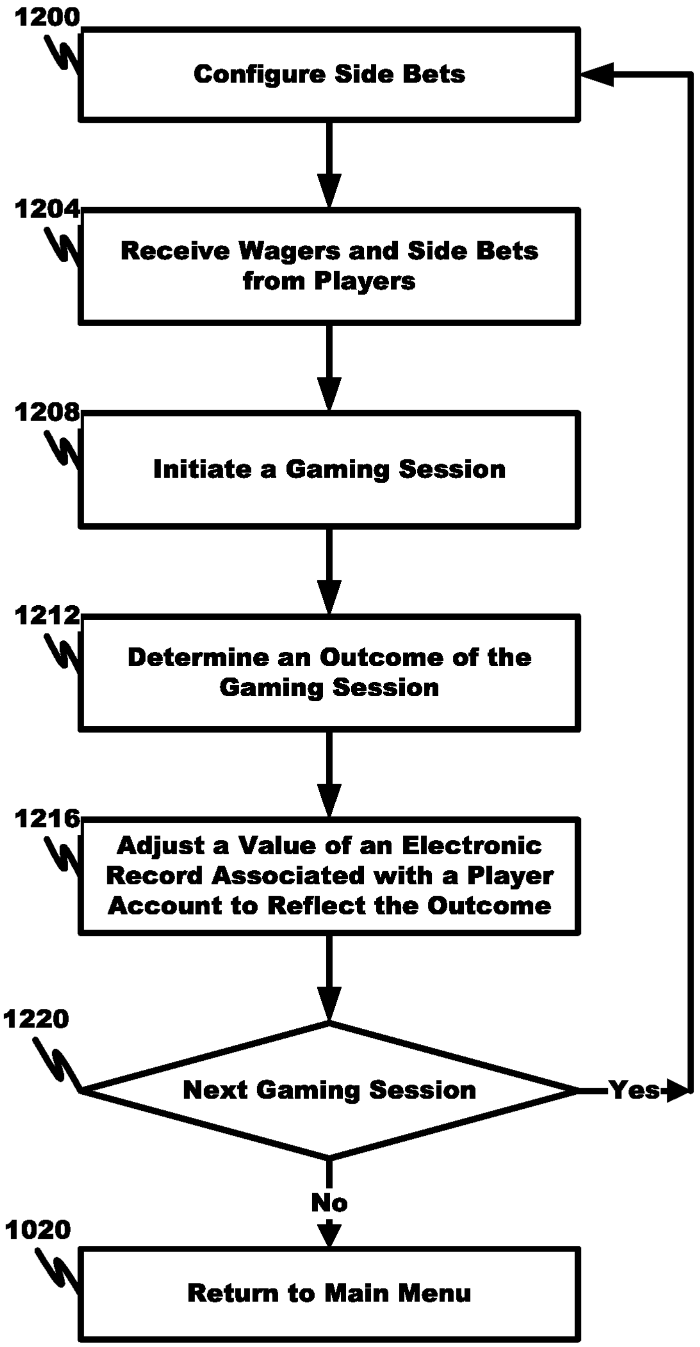
FIG. 12 is a flow diagram depicting a method of executing a gaming session in accordance with embodiments of the present disclosure.

With reference now to FIG. 12, a method of conducting a gaming session will be described in accordance with embodiments of the present disclosure.

The method begins in step 1200 by the processor interacting with the player to configure the side bets in the side bet wagering zone 704 as described above with reference to FIGS. 9-11.

The method continues in step 1204 by the processor receiving wagers and side bets from players and adjusting an electronic record, such as the wager amount field 540.

The method continues in step 1208 by the processor initiating a gaming session, typically with multiple players.

The method continues in step 1212 by the processor determining an outcome for each player of the gaming session.

The method continues in step 1216 by the processor adjusting a value of an electronic record associated with a player account of each player to reflect the respective outcome. The electronic account can be for example the available credit field 536, credit meter 528, wager credit field 608, award information field 612, and/or award history field 620.

In decision diamond 1220, the processor determines whether or not it has received a command to initiate a next gaming session. If so, the processor returns to step 1200 and, if not, proceeds to step 1020.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The invention is claimed as follows:

1. A electronic gaming system, comprising:

an interface to display gaming information and receive input from players;

a display;

an event handler, in communication with the interface, to detect for each selected side bet icon of a plurality of side bet icons, each selected side bet icon being associated with a different corresponding side bet in a player-selectable set of side bets, an event associated with a player's association of the selected side bet icon with a selected target location on the display, wherein a number of selectable target locations is less than a number of side bets in the player-selectable set of side bets;

a processor coupled with the interface and event handler; and a memory coupled with and readable by the processor and storing therein a set of instructions which, when executed by the processor, causes the processor to:

detect, by the event handler, a first event and, in response to the detected first event, associate a first selected side bet icon corresponding to the first event with a selected first target location on the display, wherein a plurality of selected side bet icons, including the first selected side bet icon, are associated with different corresponding selected target locations on the display;

receive, and cause the display to render, gaming information received from a multi-player gaming session associated with the plurality of selected side bet icons;

determine, from the gaming information, a game outcome of the multi-player gaming session relative to each side bet associated with each of the plurality of selected side bet icons; and for each side bet associated with each of the plurality of selected side bet icons, adjust a stored value of an electronic record associated with an account of a player to reflect the game outcome.

2. The electronic gaming system of claim 1, wherein the processor enables an independent credit meter for a selected side bet associated with each of the plurality of selected side bet icons, each selected side bet icon being associated with a different credit meter, wherein, as part of the multi-player gaming session, the processor receives, from first and second players through the interface, a selection of first and second subsets, respectively, of the player-selectable set of side bets for a corresponding one of the first and second players to use in the multi-player gaming session, and wherein a number of side bets in each of the first and second subsets of the player-selectable set of side bets is less than a number of side bets in the player-selectable set of side bets.

3. The electronic gaming system of claim 2, wherein the interface comprises a network interface, wherein a side bet in the first subset of the player-selectable set of side bets is different from a side bet in the second subset of the player-selectable set of side bets, and wherein the set of instructions, when executed by the processor, further causes the processor to determine an outcome of the multi-player gaming session relative to each corresponding side bet in the first and second subsets and adjust a value of an electronic record associated with an account of each of the first and second players to reflect the outcome of the multi-player gaming session.

4. The electronic gaming system of claim 1, further comprising a timer to generate a timer value, wherein the event comprises the timer value being less than a specified value, wherein the interface renders, in a multi-game view, gaming information from a plurality of different electronic gaming systems and, in a selected game view, gaming information from a selected one of the plurality of different electronic gaming systems, wherein the interface receives the gaming information from the selected one of the plurality of different electronic gaming systems for the selected game view and each side bet associated with each of the plurality of selected side bet icons are related to a game outcome of the multi-player gaming session described in the gaming information.

5. The electronic gaming system of claim 2, wherein a side bet in the first subset of the player-selectable set of side bets is not in the second subset of the player-selectable set of side bets, wherein the processor receives, from a player, a selection at a first display location of a side bet object corresponding to a side bet in the player-selectable set of side bets, the selected side bet object comprising a side bet icon, and a request to move the side bet object to a different second display location;

in response, associates the selected side bet object with the different second display location;

causes the side bet icon to be displayed at the different second display location; and enables an independent credit meter for the side bet associated with the side bet object.

6. The electronic gaming system of claim 2, wherein the first event corresponds to grabbing a side bet icon, wherein a second event corresponds to dragging the side bet icon, and a third event corresponds to dropping the side bet icon at a selected target location wherein the processor associates the side bet icon with the selected target location on the display only after the event handler detects each of the first, second, and third events with respect to the side bet icon, and wherein the first and second subsets of the player-selectable set of side bets contain different numbers of side bets.

7. The electronic gaming system of claim 2, wherein the first event corresponds to the first player selecting by a pointer a side bet icon, wherein a second event corresponds to the first player moving the pointer to a selected target location, wherein the processor associates the side bet icon with the selected target location on the display only after the event handler detects each of the first and second events with respect to the side bet icon, wherein the processor causes the interface to display to the first player a first display configuration of the first subset of the player-selectable set of side bets and display to the second player a second display configuration of the second subset of the player-selectable set of side bets, and wherein the first and second display configurations are different.

8. The electronic gaming system of claim 2, wherein the first subset comprises a first side bet of the player-selectable set of side bets and the second subset of the player-selectable set of side bets comprises a different second side bet of the player-selectable set of side bets, and wherein the set of instructions, when executed by the processor, further causes the processor to:

cause display, by the interface, of a plurality of objects representing side bets of the player-selectable set of side bets at a first display portion and a plurality of target locations at a second display portion;

detect a release by the first player of an object corresponding to the first side bet at a first target location of the plurality of target locations;

associate the first side bet with the first target location; and thereafter cause the display, by the interface, of the first side bet at the first target location.

9. An electronic gaming system, comprising:

a processor; and a memory coupled with and readable by the processor and storing therein a set of instructions which, when executed by the processor, causes the processor, as part of a multi-player gaming session, to:

receive, from a first player, a selection of a first subset of a player-selectable set of side bets for the first player to use in the multi-player gaming session, each side bet of the first subset corresponding to a potential event in the multi-player gaming session;

receive, from a second player, a selection of a second subset of the player-selectable set of side bets for the second player to use in the multi-player gaming session, wherein at least one side bet in the first subset is different from each side bet in the second subset of the player-selectable set of side bets; and initiate the multi-player gaming session comprising side bet wagers placed on corresponding side bets in the first and second subsets of the player-selectable set of side bets selected by the first and second players, respectively.

10. The electronic gaming system of claim 9, wherein the first and second subsets of the player-selectable set of side bets contain different numbers of side bets and wherein the processor:

determines an outcome of the multi-player gaming session relative to each corresponding side bet in the first and second subsets; and adjusts a value of an electronic record associated with an account of each of the first and second players to reflect the outcome.

11. The electronic gaming system of claim 9, wherein the processor is coupled to a user interface that comprises a touch display interface, and the processor:

renders, in a multi-game view, gaming information from a plurality of different electronic gaming systems and, in a selected game view, gaming information from a selected one of the plurality of different electronic gaming systems, wherein the user interface receives the gaming information from the selected one of the plurality of different electronic gaming systems for the selected game view and the first and second subsets of the player-selectable set of side bets are related to a game outcome of the multi-player gaming session described in the gaming information received from the selected one of the plurality of different electronic gaming systems;

instantiates a set of independent credit meters, each credit meter being associated with and tracking activity related to a corresponding side bet in one of the first and second subsets of the player-selectable set of side bets;

instantiates an event handler, to detect an event associated with user movement of a side bet icon associated with a side bet and release of the side bet icon at a selected location on a display, each side bet in the player-selectable set of side bets corresponding to a different side bet icon; and a timer to generate a timer value;

receives, from the event handler, an event and, when the timer value is less than a specified value, associates the side bet icon with the selected location on the display and enables an independent credit meter for the side bet associated with the side bet icon;

receives and causes the display to render, the gaming information received from the selected one of the plurality of different electronic gaming systems;

determines, from the gaming information received from the selected one of the plurality of different electronic gaming systems, the game outcome of a gaming session relative to each side bet in the first and second subsets of the player-selectable set of side bets; and for each side bet in the first and second subsets of the player-selectable set of side bets, adjusts a stored value of an electronic record associated with an account of the corresponding first or second player to reflect the game outcome.

12. The electronic gaming system of claim 9, wherein a number of side bets in each of the first and second subsets of the player-selectable set of side bets is less than a number of side bets in the player-selectable set of side bets.

13. The electronic gaming system of claim 9, wherein a side bet in the first subset of the player-selectable set of side bets is not in the second subset of the player-selectable set of side bets.

14. The electronic gaming system of claim 9, wherein the processor:

detects, a player gesture;

recognizes the detected player gesture;

maps the recognized detected player gesture to a corresponding command; and executes the corresponding command, wherein a number of side bets in the first subset of the player-selectable set of side bets selected by the first player is different from a number of side bets in the second subset of the player-selectable set of side bets selected by the second player.

15. The electronic gaming system of claim 9, wherein the processor is coupled to a user interface and the processor:

causes display to the first player of a first display configuration of the first subset of the player-selectable set of side bets and display to the second player a second display configuration of the second subset of the player-selectable set of side bets, wherein the first and second display configurations are different, wherein the first subset of the player-selectable set of side bets comprises a first side bet of the player-selectable set of side bets and the second subset of the player-selectable set of side bets comprises a different second side bet of the player-selectable set of side bets and wherein the causing comprises:

displays, by the user interface, to the first player, at a first display portion a plurality of objects representing side bets in the player-selectable set of side bets and at a second display portion a plurality of target locations;

detects a release by the first player of an object corresponding to the first side bet at a first target location of the plurality of target locations;

in response to detecting the release of the object, associates the first side bet with the first target location; and thereafter displays, by the user interface, the first side bet at the first target location.

16. A method for operating an electronic gaming system, comprising:

detecting, by an event handler, for each side bet icon, of a plurality of side bet icons, associated with a corresponding side bet in a player-selectable set of side bets, an event associated with a player's selection of a side bet icon to be associated with a selected target location on a display, each side bet in the player-selectable set of side bets corresponding to a different side bet icon and a number of selectable target locations being less than a number of side bets in the player-selectable set of side bets;

receiving, by a processor and for each selected side bet icon, an event and, responsive to the received event, associating the selected side bet icon with a respective selected target location on the display, each selected side bet icon being associated with a different selected target location on the display;

receiving and causing by the processor the display to render gaming information received from a multi-player gaming session associated with the selected side bet icons;

determining, by the processor from the gaming information, a game outcome of the multi-player gaming session relative to each selected side bet icon; and for each selected side bet icon, adjusting, by the processor, a stored value of an electronic record associated with an account of a player to reflect the game outcome.

17. The method of claim 16, further comprising:

enabling an independent credit meter for a selected side bet associated with each selected side bet icon, each selected side bet icon being associated with a different credit meter, and as part of the multi-player gaming session, receiving, from first and second players through an interface, a selection of first and second subsets, respectively, of the player-selectable set of side bets for a corresponding one of the first and second players to use in the multi-player gaming session, wherein a number of side bets in each of the first and second subsets of the player-selectable set of side bets is less than a number of side bets in the player-selectable set of side bets.

18. The method of claim 17, wherein a first event corresponds to grabbing a side bet icon, wherein a second event corresponds to dragging the side bet icon, and a third event corresponds to dropping the side bet icon at a selected target location wherein the processor associates the side bet icon with the selected target location on the display only after the event handler detects each of the first, second, and third events with respect to the side bet icon, and wherein the first and second subsets of the player-selectable set of side bets contain different numbers of side bets.

19. The method of claim 17, wherein a first event corresponds to the first player selecting by a pointer a side bet icon, wherein a second event corresponds to the first player moving the pointer to a selected target location, wherein the processor associates the side bet icon with the selected target location on the display only after the event handler detects each of the first and second events with respect to the side bet icon, wherein the processor causes the interface to display to the first player a first display configuration of the first subset of the player-selectable set of side bets and display to the second player a second display configuration of the second subset of the player-selectable set of side bets, and wherein the first and second display configurations are different.

20. The method of claim 17, wherein the first subset comprises a first side bet of the player-selectable set of side bets and the second subset of the player-selectable set of side bets comprises a different second side bet of the player-selectable set of side bets, and further comprising:

causing display of a plurality of objects representing side bets of the player-selectable set of side bets at a first display portion and a plurality of target locations at a second display portion;

detecting a release by the first player of an object corresponding to the first side bet at a first target location of the plurality of target locations;

associating the first side bet with the first target location; and thereafter causing the display of the first side bet at the first target location.

* * * * *